(12) United States Patent
Okubo et al.

(10) Patent No.: US 7,811,526 B2
(45) Date of Patent: Oct. 12, 2010

(54) DEVICE FOR RECOVERING FEEDSTOCK LIQUID, DEVICE FOR SUPPLYING A FEEDSTOCK LIQUID, DEVICE FOR SOLIDIFYING THE SURFACES OF DROPS, AND APPARATUS FOR PRODUCING AMMONIUM DIURANATE PARTICLES

(75) Inventors: Kazutoshi Okubo, Ibaraki (JP);
Masashi Takahashi, Ibaraki (JP);
Tomoo Takayama, Ibaraki (JP);
Kazuhisa Nishimura, Ibaraki (JP);
Masaki Honda, Ibaraki (JP)

(73) Assignee: Nuclear Fuel Industries, Ltd., Tokyo (JP)

( * ) Notice: Subject to any disclaimer, the term of this patent is extended or adjusted under 35 U.S.C. 154(b) by 1130 days.

(21) Appl. No.: 10/575,661

(22) PCT Filed: Oct. 15, 2004

(86) PCT No.: PCT/JP2004/015278

§ 371 (c)(1),
(2), (4) Date: Jun. 20, 2006

(87) PCT Pub. No.: WO2005/037715

PCT Pub. Date: Apr. 28, 2005

(65) Prior Publication Data

US 2007/0056637 A1    Mar. 15, 2007

(30) Foreign Application Priority Data

| Oct. 16, 2003 | (JP) | ............................ 2003-356300 |
| Feb. 2, 2004 | (JP) | ............................ 2004-026134 |
| Feb. 6, 2004 | (JP) | ............................ 2004-030112 |
| Mar. 23, 2004 | (JP) | ............................ 2004-084835 |
| Aug. 23, 2004 | (JP) | ............................ 2004-241886 |
| Aug. 24, 2004 | (JP) | ............................ 2004-243811 |
| Sep. 30, 2004 | (JP) | ............................ 2004-286349 |
| Oct. 1, 2004 | (JP) | ............................ 2004-289669 |

(51) Int. Cl.
- G21C 1/00 (2006.01)
- G21C 21/02 (2006.01)
- G21C 3/62 (2006.01)
- C01G 43/00 (2006.01)

(52) U.S. Cl. .................. 422/159; 252/625; 252/634; 252/635; 252/636; 252/641

(58) Field of Classification Search ................ 422/159; 252/625, 634, 635, 636, 641
See application file for complete search history.

(56) References Cited

U.S. PATENT DOCUMENTS

| 3,313,602 | A | * | 4/1967 | Flack et al. ................. 423/252 |
| 3,340,567 | A | * | 9/1967 | Fitch et al. .................... 425/7 |
| 3,495,954 | A | * | 2/1970 | Grimes et al. .............. 423/252 |
| 4,043,507 | A | * | 8/1977 | Wace ...................... 239/102.2 |
| 4,202,793 | A | | 5/1980 | Bezzi et al. |
| 4,209,492 | A | * | 6/1980 | Naefe ........................ 422/159 |
| 4,224,258 | A | * | 9/1980 | Langen et al. ................. 264/5 |
| 4,431,164 | A | * | 2/1984 | Jungo et al. .................. 264/13 |
| 4,615,834 | A | * | 10/1986 | Yamagishi et al. .......... 252/635 |
| 4,778,665 | A | | 10/1988 | Krishnamurthy et al. |
| 5,514,306 | A | | 5/1996 | Larson et al. |
| 5,698,173 | A | | 12/1997 | McLean, II et al. |
| 5,990,191 | A | * | 11/1999 | Kikuta et al. ................. 522/87 |
| 2007/0178036 | A1 | | 8/2007 | Takahashi |

FOREIGN PATENT DOCUMENTS

| EP | 0 998 854 A1 | 5/2000 |
| EP | 1 081 716 A1 | 3/2001 |
| ES | 2 102 933 A1 | 8/1997 |
| JP | 44-12009 B | 5/1969 |
| JP | 49-31000 A | 8/1974 |
| JP | 5-256973 A | 10/1993 |
| JP | 5-279043 A | 10/1993 |
| JP | 06-066756 | 3/1994 |
| JP | 06-191851 A | 7/1994 |
| JP | 8-151204 A | 6/1996 |
| JP | 08-151204 A | 6/1996 |
| JP | 8-231227 A | 9/1996 |
| JP | 09-054187 A | 2/1997 |
| JP | 2000-146993 A | * 11/1998 |

| | | |
|---|---|---|
| JP | 11-244683 A | 9/1999 |
| JP | 2000-169134 A | 6/2000 |

OTHER PUBLICATIONS

Machine translation of JP 2000-146993A—Jun. 1, 2009.*
Notification of Reasons for Rejection issued by the JPO mailed on Jan. 9, 2009 in Japanese Patent Application No. 2003-356300 together with an English language translation of said Notification.
Notification of Reasons for Rejection issued by the JPO mailed on Jan. 9, 2009 in Japanese Patent Application No. 2004-084835 together with an English language translation of said Notification.
Notification of Reasons for Rejection issued by the JPO mailed on Feb. 13, 2009 in Japanese Patent Application No. 2003-348727 together with an English language translation of said Notification.
Notification of Reasons for Rejection issued by the JPO mailed on Feb. 27, 2009 in Japanese Patent Application No. 2004-026134 together with an English language translation of said Notification.
Notification of Reasons for Rejection issued by the JPO mailed on Feb. 27, 2009 in Japanese Patent Application No. 2004-030112 together with an English language translation of said Notification.
"Genshiro Zairyo Handbook" or "A Handbook about Nuclear Reactor Materials," published by Nikkan Kogyo Shimbun, Ltd. title pages and pp. 227-239, Oct. 31, 1977.
"Genshiryoku Handbook" or "Nuclear Energy Handbook," published by Ohmsha, Ltd., title pages and pp. 528-529, Dec. 20, 1995. Aug. 26, 2009.
Japanese Office Action (Notification of Reasons for Rejection) dated Jan. 29, 2010, which issued in the counterpart Japanese Patent Application No. 2004-289669, and an English-language translation thereof.
A partial English-language translation of JP 5-256973, Feb. 25, 2010.

* cited by examiner

*Primary Examiner*—Walter D Griffin
*Assistant Examiner*—Huy-Tram Nguyen

(74) *Attorney, Agent, or Firm*—Holtz, Holtz, Goodman & Chick, P.C.

(57) ABSTRACT

This invention provides a dripping nozzle device to produce ADU particles with good sphericity, a device for recovering a feedstock liquid to prepare a uniform feedstock liquid, a device for supplying a feedstock liquid to form drops with a uniform volume, a device for solidifying the surfaces of drops so that the drops will not deform easily when they fall onto and hit the surface of an aqueous ammonia solution, a device for circulating an aqueous ammonia solution so that the uranyl nitrate in the drops can be changed to ammonium diuranate completely, to such an extent that uranyl nitrate in the center of each drop is changed to ammonium diuranate, and an apparatus for producing ammonium diuranate particles with good sphericity. The dripping nozzle device is provided with a single vibrator to vibrate nozzles simultaneously. The device for recovering a feedstock liquid recovers the feedstock liquid remaining in the nozzles and mixes it with a fresh feedstock liquid. The device for supplying a feedstock liquid is provided with a light irradiator for irradiating falling drops with light. The device for solidifying the surfaces of drops sprays ammonia gas over each of the paths along which the drops dripping from the nozzles fall. The device for circulating an aqueous ammonia solution enables drops to flow upward in the aqueous ammonia solution in the aqueous ammonia solution reservoir. The apparatus for producing ammonium diuranate utilizes these devices.

27 Claims, 19 Drawing Sheets

DEVICE FOR RECOVERING FEEDSTOCK LIQUID, DEVICE FOR SUPPLYING A FEEDSTOCK LIQUID, DEVICE FOR SOLIDIFYING THE SURFACES OF DROPS, AND APPARATUS FOR PRODUCING AMMONIUM DIURANATE PARTICLES

This application is the United States national phase application of International Application PCT/JP2004/015278 filed Oct. 15, 2004.

TECHNICAL FIELD

The present invention relates to a dripping nozzle device, a device for recovering a feedstock liquid, a device for supplying a feedstock liquid, a device for solidifying the surfaces of drops, a device for circulating an aqueous ammonia solution, and an apparatus for producing ammonium diuranate particles. More particularly, the present invention relates to a dripping nozzle device capable of dripping a feedstock liquid in drops that are suitable for forming ammonium diuranate particles with good sphericity. The present invention also provides a device for recovering a feedstock liquid, capable of recovering a feedstock liquid to be dripped so that uniform deformation-free ammonium diuranate particles can be produced at a high yield. The present invention further relates to a device capable of supplying a feedstock liquid to the nozzle so that the feedstock liquid including uranyl nitrate is allowed to fall in drops, each of which has a same volume. The present invention still further relates to a device for solidifying the surfaces of drops, which device is capable of solidifying the surfaces of the drops having been dripped from the nozzle device so that the drops will not deform easily when they fall onto and hit the surface of an aqueous ammonia solution stored in an aqueous ammonia solution reservoir. The present invention more over relates to a device for circulating an aqueous ammonia solution so that the uranyl nitrate in the drops, which have fallen into the aqueous ammonia solution, can be changed to ammonium diuranate completely, to such an extent that uranyl nitrate in the center of each drop is changed to ammonium diuranate. The present invention also relates to an apparatus for producing ammonium diuranate particles, which apparatus is capable of producing ammonium diuranate particles with good sphericity, and which apparatus comprises at least one of the dripping nozzle device, the device for recovering a feedstock liquid, the device for supplying a feedstock liquid, the device for solidifying the surfaces of drops, and the device for circulating an aqueous ammonia solution.

BACKGROUND ART

A high-temperature gas reactor has a reactor core, into which fuels for the high-temperature gas reactor are introduced, which reactor core is made of graphite that has a large thermal capacity and keeps its crystalline structure in good condition at high temperatures. The high temperature gas reactor employs, as coolant gas, a gas such as helium gas, which is assessed as being safe because helium gas does not react even at high temperatures. The employment of helium gas makes it possible to take the coolant gas away safely even when the temperature around the outlet of the coolant gas is high. Therefore, the coolant gas, which has been heated up to a high temperature of about 1000° C., is used as a safe heat source in a wide variety of fields such as hydrogen production and chemical plants, as well as power plants.

Fuels for the high-temperature gas reactor typically comprises a fuel kernel and a coating layer with which the fuel kernel is covered. The fuel kernel is a small particle with a diameter of about 350 to 650 µm, made by sintering uranium dioxide into a physical state like ceramics.

The coating layer generally comprises concentrically laminated sub-coating layers. When the coating layer has four sub-coating layers, they are called "the first sub-coating layer", "the second sub-coating layer", "the third sub-coating layer", and "the fourth sub-coating layer" from the sub-coating layer adjacent to the fuel kernel. The diameter of the particle comprising the fuel kernel and four sub-coating layers is typically about 500 to 1000 µm.

The fuels for the high-temperature gas reactor may be produced in the following way with an apparatus for producing ammonium diuranate particles. Firstly, uranium oxide in the form of powder is dissolved in nitric acid, which produces a uranyl nitrate solution. Then, the uranyl nitrate solution is mixed with pure water, a thickening agent, and other chemicals, if necessary, and the mixture is stirred. A feedstock liquid to be dripped is obtained by this process. The feedstock liquid is stored in a feedstock liquid reservoir. The feedstock liquid thus prepared is cooled to a predetermined temperature, the viscosity thereof is adjusted, and then it is transferred to a dripping nozzle device. The dripping nozzle device has one nozzle with a small diameter. The transferred feedstock liquid falls in drops from the end of the nozzle into an aqueous solution of ammonia. The uranyl nitrate included in the drops, which have fallen into the aqueous solution of ammonia, changes into ammonium diuranate from the surfaces of the drops through the reaction. If the drops including uranyl nitrate reside in the solution for a time period enough to complete the reaction, uranyl nitrate in the central part of each drop is changed to ammonium diuranate.

The drops dripped from the nozzle pass through an atmosphere of ammonia gas in the process of falling toward the surface of the aqueous ammonia solution. This ammonia gas brings about gelation on the surface of each drop, which forms a film there. The drops with the film are protected from deformation to some extent, caused by the impact that occurs when the drops fall to and hit the surface of the aqueous ammonia solution. If uranyl nitrate included in the drops that have fallen into the solution reacts with ammonia sufficiently, ammonium diuranate particles, which may sometimes be abbreviated to "ADU particles", are formed.

The ADU particles thus formed are washed, dried, and then calcined in the atmosphere, which changes the ADU particles into uranium trioxide particles. The obtained uranium trioxide particles are reduced and sintered, through which steps the uranium trioxide particles are changed into uranium dioxide particles with high density, in a condition like ceramics. The uranium dioxide particles are sieved, or classified, and fuel kernel particles with a diameter within a predetermined range are obtained.

One of the most important objectives to be achieved in the production of ADU particles is to produce ADU particles with almost the same diameter, with good sphericity or a shape that is very close to a sphere of perfect roundness, and without deficiencies inside each particle. In other words, the ADU particles are required to be of a uniform diameter, and free of deformations, made of ADU completely to the central part of each drop, and to have a flawless inside structure without cracks or other deficiencies. Another important objective is to produce ADU particles in a large quantity. In view of these objectives, the current ADU production apparatuses have a variety of problems to be solved as explained hereinafter.

In order to produce ADU particles, each of which has good sphericity, in a large quantity and a uniform quality, the dripping nozzle device should be capable of dripping the feedstock liquid so that the drops have the same volume.

However, technology has not seen such nozzles that are capable of dripping the feedstock liquid in drops with the same volume. Therefore have been desired the development of a dripping nozzle device capable of producing ADU particles with the same diameter and good sphericity, and that of an apparatus for producing ammonium diuranate particles, which may sometimes be called "apparatus for producing ADU particles" hereinafter.

The conventional apparatus for producing ADU particles comprises a dripping nozzle device with a single dripping nozzle, and the number of the produced ADU particles depends on how many times the nozzle vibrates. The number is 200 particles per second at most. In order to improve the productivity, the number of the nozzles has to be increased. When several dripping nozzles are employed, each dripping nozzle has to drip the same amount of the feedstock liquid. Dripping nozzle devices with several dripping nozzles have not been developed.

In order to produce ADU particles each of which has good sphericity and the same diameter in a large quantity, the dripping nozzles have to be capable of dripping the feedstock liquid so that the drops have the same volume.

However, technology has not seen such nozzle devices comprising nozzles that are capable of dripping the feedstock liquid in the same volume and allowing drops with the same volume to fall. Therefore have been desired the development of a dripping nozzle device to produce a large amount of uranium dioxide fuel kernels with the same diameter and good sphericity, and that of an apparatus for producing ADU particles.

With the conventional apparatus for producing ADU particles, the feedstock liquid remains in the feedstock liquid supplying pipe that transfers the feedstock liquid from the feedstock reservoir to the dripping nozzle when the dripping of the feedstock liquid from the nozzle is stopped. Then, when a fresh feedstock liquid is transferred from the reservoir to the nozzle through the feedstock liquid supplying pipe, the old feedstock liquid that has remained in the pipe is dripped into the aqueous ammonia solution.

The old feedstock liquid remaining in the pipe has different properties from the fresh one that has been stored in the reservoir under temperature control. This difference often causes deformation in ADU particles formed in the aqueous ammonia solution by the dripping, which leads to uranium dioxide particles, produced through the steps of aging the ADU particles, washing the aged, drying the washed, calcining the dried, reducing the calcined, and sintering the reduced, that do not satisfy a required sphericity, a required outer diameter of each particle, a required flawlessness of the inside structure, etc. This difference also results in a reduction in the yield of the produced uranium dioxide. We suppose that the afore-mentioned problem is caused by the state where the temperature of the remaining feedstock liquid is raised to room temperature and the viscosity thereof is decreased.

When a conventional apparatus for producing ADU particles was equipped with several nozzles to increase the production of the ADU particles, the flow rates of the feedstock liquid to be dripped from the respective nozzles had to be the same to make the ADU particles resulting from the drippings from the respective nozzles have the same predetermined volume. In order to meet this requirement, the conventional apparatus is provided with flow regulators and the dripping amount of the feedstock liquid from each nozzle is controlled. However, only with the flow regulators, it is difficult to make the flow rates of the feedstock liquid to be dripped from the nozzles identical, which results in ADU particles that do not have a uniform diameter.

The drops dripped from the nozzle or nozzles of the conventional apparatus for producing ADU particles fall toward the aqueous ammonia solution through an atmosphere of ammonia gas. Thus a film is formed on the surface of each drop due to gelation made during the falling and before reaching the surface of the aqueous ammonia solution. The film is not strong enough to prevent the drop from deformed by the impact given to the drop when it splashes down. Drops are sometimes even broken by the impact given when they hit the aqueous ammonia solution. A reaction between the deformed or broken particles of uranyl nitrate and ammonia in the aqueous ammonia solution does not lead to the production of ADU particles with good sphericity at a high yield. Also, when an apparatus for producing ADU particles with several dripping nozzles is employed and ammonia gas is sprayed over the drops dripped from the several nozzles and falling toward the solution, it is difficult to uniformly spray each drop with the gas and the drops often had wave-like patterns caused by the sprayed gas on the surfaces thereof.

The aqueous ammonia solution has to permeate into the center of each drop including uranyl nitrate dripped from the nozzle(s) of the conventional apparatus for producing ADU particles.

For the permeation of the aqueous ammonia solution is typically used an aqueous ammonia solution reservoir that contains the aqueous ammonia solution. In other words, an aqueous ammonia solution reservoir in which the aqueous ammonia solution is stored is placed right below the nozzle(s) that drip(s) the feedstock liquid including uranyl nitrate. The drops formed by dripping the feedstock liquid from the nozzle(s) of the nozzle device are allowed to fall into the aqueous ammonia solution stored in the aqueous ammonia solution reservoir.

Then, uranyl nitrate existing in the drops and ammonium ions react with each other in the solution to produce ammonium diuranate (ADU) in the drops.

The reaction between uranyl nitrate in a drop and ammonium ions starts from the surface of the drop, and then progresses to inner places of the drop as time passes. However, as the reaction between uranyl nitrate existing in the vicinity of the inner side of the surface of the drop and ammonia existing in the vicinity of the outer side of the surface of the drop proceeds, the concentration of ammonia existing in the vicinity of the outer side of the surface of the drop decreases. The decrease slows the reaction between uranyl nitrate and ammonium ions. Besides, in order for the ammonium ions to react with uranyl nitrate existing in the center of the drop, the ammonium ions existing outside the surface of the drop have to penetrate into the drop, and diffuse and move into the central part thereof. Therefore, it takes a long time to change uranyl nitrate in the center of the drop to ammonium diuranate, which is one problem. Another problem is that the reaction between uranyl nitrate and ammonium ions is often insufficient under the conditions where the drops stay still in the aqueous ammonium solution for a predetermined period of time. Due to these problems, with the conventional apparatus for producing ADU particles, it is difficult to produce ADU particles with a large diameter, which sometimes results in inferior fuel kernels with pores inside, obtained after the treatments in the subsequent steps.

Still another problem is that ADU particles with their central parts remaining unreacted have jelly-like central parts and that the ADU particles are very soft. Therefore when these ADU particles, the specific gravity of which is large because they include uranium, are piled up and accumulated, ADU particles located near and at the bottom of the aqueous ammonia solution reservoir become deformed, which results in the production of a large quantity of inferior particles with bad sphericity.

The object of the present invention is to solve the afore-mentioned problems.

One objective of the present invention is to provide a dripping nozzle device or dripping nozzle devices capable of supplying a feedstock liquid to a dripping nozzle or dripping nozzles at the same and constant flow rate, and allowing the feedstock liquid to fall in drops that include uranyl nitrate so that ADU particles with the same shape and size are produced in large quantities; and an apparatus for producing ADU particles that employs the dripping nozzle device or dripping nozzle devices as a part of it.

Another objective of the present invention is to provide a device for recovering a feedstock liquid, which is capable of solving the afore-mentioned conventional problems and producing ADU particles of uniform size and free of deformation at a high yield; and an apparatus for producing ADU particles that employs the device for recovering a feedstock liquid as a part of it.

Still another objective of the present invention is to provide a device for supplying a feedstock liquid to a dripping nozzle or nozzles that allow the feedstock liquid including uranyl nitrate to fall in drops, so that the afore-mentioned problems are solved and ADU particles of uniform size are produced; and an apparatus for producing ADU particles that employs the device for supplying a feedstock liquid as a part of it.

A further objective of the present invention is to provide a device for solidifying the surfaces of drops capable of appropriately solidifying the surfaces of drops including uranyl nitrate, so that the afore-mentioned problems are solved and ADU particles with good sphericity are produced; and an apparatus for producing ADU particles that employs the device for solidifying the surfaces of drops as a part of it.

A still further objective of the present invention is to provide a device for circulating an aqueous ammonia solution, capable of solving the afore-mentioned problems and producing ammonium diuranate particles with good sphericity and without deficiencies in the inside structure thereof; and an apparatus for producing ADU particles that employs the device for circulating an aqueous ammonia solution as a part thereof.

DISCLOSURE OF THE INVENTION

Problems to be Solved by the Invention

The present invention provides:

(1) a dripping nozzle device comprising dripping nozzles for allowing a feedstock liquid that includes uranyl nitrate to fall in drops to an aqueous ammonium solution stored in an aqueous ammonia solution reservoir; and a vibrator for vibrating the nozzles simultaneously, (2) the dripping nozzle device according to paragraph (1), wherein each nozzle is provided with a flow regulator for controlling a dripping rate of the feedstock liquid and a volume of each of the drops, (3) a dripping nozzle device comprising a dripping nozzle or dripping nozzles for allowing a feedstock liquid that includes uranyl nitrate to fall in drops; and a feedstock liquid container capable of containing a predetermined volume of the feedstock liquid supplied from a feedstock liquid reservoir in which the feedstock liquid is stored, the container having an inner volume larger than the inner volume of the dripping nozzle or the inner volume of each of the dripping nozzles, wherein the container supplies the contained feedstock liquid to the dripping nozzle or all the dripping nozzles by the force of gravity, (4) the dripping nozzle device according to paragraph (3), wherein the feedstock liquid container has a horizontal section, the area of which is larger than the area of the horizontal section of the dripping nozzle or that of each of the dripping nozzles, (5) the dripping nozzle device according to paragraph (3) or (4), wherein the feedstock liquid container is directly connected to the dripping nozzle or all the dripping nozzles, (6) the dripping nozzle device according to any one of paragraphs (3)-(5), wherein the end of the dripping nozzle, or the respective ends of all the dripping nozzles, from which the feedstock liquid including uranyl nitrate is dripped, are provided with an edge thinned in the direction of the falling of the drops, (7) the dripping nozzle device according to anyone of paragraphs (1)-(6), further comprising a feedstock liquid supplier for supplying the feedstock liquid stored in the feedstock liquid reservoir to the nozzle or nozzles substantially at a constant rate and without pulsation, (8) a device for recovering a feedstock liquid, comprising a remaining feedstock liquid collector, placed between a dripping nozzle or dripping nozzles of a dripping nozzle device that comprises the dripping nozzle or dripping nozzles for dripping the feedstock liquid including uranyl nitrate to an aqueous ammonia solution wherein the feedstock liquid is transferred from a feedstock liquid reservoir through a feedstock liquid transferring passage to the dripping nozzle or nozzles and an aqueous ammonia solution reservoir in which an aqueous ammonia solution is stored, said remaining feedstock liquid collector for receiving a remainder of the feedstock liquid remaining in the feedstock liquid transferring passage when the dripping of the feedstock liquid from the dripping nozzle or nozzles to the aqueous ammonia solution is stopped; and a feedstock liquid remainder transferring passage for transferring the remainder to the feedstock liquid reservoir, (9) the device for recovering a feedstock liquid according to paragraph (8), wherein the dripping nozzle device is a device recited in any one of paragraphs (1)-(7),

(10) a device for supplying a feedstock liquid comprising a light irradiator for irradiating with light drops of a feedstock liquid that includes uranyl nitrate, the drops being dripped from a dripping nozzle device wherein the dripping nozzle device comprises dripping nozzles and the drops are dripped from each of the dripping nozzles; and flow regulators, each of which controls an amount of the feedstock liquid to be supplied to each dripping nozzle from a feedstock liquid reservoir in which the feedstock liquid is stored, depending on conditions of the falling of the drops irradiated with the light,

(11) the device for supplying a feedstock liquid according to paragraph (10), wherein the dripping nozzle device is a device recited in any one of paragraphs (1)-(7),

(12) the device for supplying a feedstock liquid according to paragraph (10) or (11), wherein the light irradiator is a strobe light irradiator for emitting a light that flashes on and off periodically,

(13) a device for supplying a feedstock liquid according to any one of paragraphs (10)-(12), further comprising photosensors for sensing the light emitted by the light irradiator, and a controller for controlling the flow regulators upon an input of a sensing signal outputted by the photosensors so that the nozzles drip at the same dripping rate, the drops dripped from each nozzle have the same volume, and a drop dripped from one of the nozzles has the same volume as a drop dripped from any other one of the nozzles,

(14) a device for solidifying the surfaces of drops, comprising an ammonia gas sprayer for spraying ammonia gas to a path or each of paths along which drops of the feedstock liquid that includes uranyl nitrate fall to an aqueous ammonia solution stored in an aqueous ammonia solution reservoir, the drops being dripped from a dripping nozzle device wherein the dripping nozzle device comprises one or more nozzles and the drops are dripped from the nozzle or the nozzles,

(15) the device for solidifying the surfaces of drops according to paragraph (14), wherein the dripping nozzle device is a device recited in any one of paragraphs (1)-(7),

(16) a device for solidifying the surfaces of drops according to paragraph (14) or (15), further comprising an ammonia gas discharger for discharging the ammonia gas sprayed by the ammonia gas sprayer, the ammonia gas discharger being placed at a location opposite the ammonia gas sprayer with the path or the paths of the drops being in between,

(17) the device for solidifying the surfaces of drops according to any one of paragraphs (14)-(16), wherein the ammonia gas sprayer comprises ammonia gas spraying nozzles wherein the flow rates of the ammonia gas sprayed from the respective nozzles are adjustable,

(18) a device for solidifying the surfaces of drops according to any one of paragraphs (14)-(17), the aqueous ammonia solution reservoir further comprising an aqueous ammonia solution discharger for discharging the aqueous ammonia solution stored therein to keep constant the distance between the end(s) of the dripping nozzle(s) and the surface of the aqueous ammonia solution,

(19) the device for solidifying the surfaces of drops according to any one of paragraphs (14)-(18), wherein the distance between the end(s) of the dripping nozzle(s) and the ends of the ammonia gas spraying nozzles is from 10 mm to 40 mm, the shortest distance between the path or paths along which the drops dripped from the end(s) of the dripping nozzle(s) fall and the ends of the ammonia gas spraying nozzles is from 3 mm to 15 mm, and the flow rate of the ammonia gas sprayed from the ammonia gas spraying nozzles is from 3 L/min to 25 L/min,

(20) a device for circulating an aqueous ammonia solution, comprising an aqueous ammonia solution circulating path through which an aqueous ammonia solution is circulated and returned to an aqueous ammonia solution reservoir in which the aqueous ammonia solution is stored, from a lower part of the reservoir, so that ammonium diuranate particles produced by a reaction between uranyl nitrate and ammonia flow upward in the aqueous ammonia solution, wherein the uranyl nitrate is included in drops that are formed by dripping of a feedstock liquid including uranyl nitrate from a dripping nozzle or dripping nozzles of a dripping nozzle device, and the ammonia is of the aqueous ammonia solution stored in the aqueous ammonia solution reservoir, which solution receives the drops falling from the dripping nozzle or nozzles,

(21) the device for circulating an aqueous ammonia solution according to paragraph (20), wherein the dripping nozzle device is a device recited in any one of paragraphs (1)-(7),

(22) the device for circulating an aqueous ammonia solution according to paragraph (20) or (21), wherein the aqueous ammonia solution reservoir has a side hole in a sidewall thereof and a bottom hole in the lower part thereof; and the aqueous ammonia solution circulating path comprises a pipe for circulating the aqueous ammonia solution connected to the side hole and the bottom hole, and a pump placed in the pipe,

(23) the device for circulating an aqueous ammonia solution according to paragraph (22), wherein the side hole is covered with a member for preventing solids in the aqueous ammonia solution reservoir from flowing into the pipe,

(24) the device for circulating an aqueous ammonia solution according to any one of paragraphs (20)-(23), wherein the aqueous ammonia solution reservoir has a bottom provided with a collecting pipe and an opening/closing device capable of opening and closing the collecting pipe, and

(25) an apparatus for producing ammonium diuranate particles, comprising at least one of the dripping nozzle device as recited in any one of paragraphs (1)-(7), the device for recovering a feedstock liquid as recited in paragraph (8) or (9), the device for supplying a feedstock liquid as recited in any one of paragraphs (10)-(13), the device for solidifying the surfaces of drops as recited in any one of paragraphs (14)-(19), and the device for circulating an aqueous ammonia solution as recited in any one of paragraphs (20)-(24).

The dripping nozzle device recited in paragraph (1) employs a single vibrator to vibrate the dripping nozzles, and therefore resonance between the dripping nozzles is eliminated, which means that a dripping nozzle is not affected by the other dripping nozzles. Thus the particle diameters of the drops can be controlled easily. Since the dripping nozzle device recited in paragraph (2) has the dripping nozzles, each of which is provided with a flow regulator, the difference in the pressure losses caused by the flow of the feedstock liquid in the nozzles can be reduced, which produces ADU particles of uniform particle size.

When the dripping nozzle device recited in paragraph (3) is employed, a drop falls from the end of a dripping nozzle in the following way. The feedstock liquid flows down to the end of the nozzle inside the nozzle, and the liquid flows down beyond the end with keeping stuck to the end and forms a droplet. Then, as the liquid further flows down, the droplet stuck to the end swells and the volume of the droplet increases. When the weight of the droplet exceeds the force that allows the drop to stick to the end, the feedstock liquid in the shape of a drop falls from the end of the dripping nozzle. In this process, a fluid pressure due to a predetermined volume of the feedstock liquid contained in the feedstock liquid container, wherein the predetermined volume is larger than the inner volume of the dripping nozzle, is applied to the droplet that is swelling with sticking to the end of the dripping nozzle. In other words, a predetermined magnitude of hydrostatic pressure is applied to the droplet sticking to the end of the nozzle. As a result, each of the swollen droplets that fall one after another always receives the same hydrostatic pressure, which makes the drops falling one after another have the same volume. Since drops with the same volume fall continually from the end of the nozzle, ADU particles of uniform size are produced from these drops. In the present invention, the feedstock liquid container works as a pressure-applying member to apply a predetermined magnitude of hydrostatic pressure to the droplets sticking to the end of the dripping nozzle.

The dripping nozzle device recited in paragraph (4) has, in addition to the technical features recited in paragraph (3), a feedstock liquid container, the horizontal section of which has a larger area than that of the nozzle or that of each of the nozzles. This design makes it possible to reduce the height of the feedstock liquid container, the volume of which must be larger than that of the dripping nozzle or that of each of the nozzles.

The dripping nozzle device recited in paragraph (5) is capable of transferring the feedstock liquid from the feedstock liquid container to the dripping nozzle or dripping nozzles without causing pressure loss, which is usually caused because of the use of pipes, compared with devices that utilize pipes to send the feedstock liquid from the feedstock liquid container to the dripping nozzle or dripping nozzles. The technical advantage due to the non-occurrence of pressure loss, in addition to the advantages resulting from the features recited in paragraphs (3) and (4), is that ADU particles with a uniform particle size are produced.

The dripping nozzle device recited in paragraph (6) has a dripping nozzle or dripping nozzles, the end or the respective ends of which are provided with an edge, which makes it possible to smoothly separate the drops from the end of the nozzles or the ends of the respective nozzles. This is another reason that the device is capable of producing ADU particles with a uniform particle size.

The dripping nozzle device recited in paragraph (7) is capable of supplying the liquid substantially at a constant rate and without pulsation, which causes no deviation in the diameters of the drops falling from the nozzle or nozzles. Therefore ADU particles with a uniform particle size can be obtained.

The device for recovering a feedstock liquid recited in paragraph (8) has a remaining feedstock liquid collector that receives a remainder of the feedstock liquid, which includes uranyl nitrate, remaining in the feedstock liquid transferring passage after the termination of the previous dripping operation, when a fresh feedstock liquid that is prepared after the completion of the previous dripping operation is dripped from the nozzle or nozzles. If the old feedstock liquid collected in the remaining feedstock liquid collector is dripped from the nozzle or nozzles to the aqueous ammonia solution, ammonium diuranate particles with good sphericity cannot be produced because the viscosity of the feedstock liquid remaining in the feedstock liquid transferring passage has changed for the time period between the previous dripping operation and the present dripping operation. However, the device for recovering a feedstock liquid makes it possible to mix the collected remainder feedstock liquid collected in the remaining feedstock liquid collector with a newly prepared feedstock liquid, to appropriately adjust the viscosity of the mixed by re-controlling the temperature thereof, and to reuse the remainder. The use of this device leads to the production of ADU particles of uniform quality, without problems in respect of the sphericity thereof, the outer diameter thereof, and the inside structure thereof, at a high yield.

The device for supplying a feedstock liquid recited in paragraph (10) supplies a feedstock liquid including uranyl nitrate to dripping nozzles, and the nozzles drip the feedstock liquid continually. The light irradiator irradiates the continually dripped drops with light, and the conditions of the falling of the drops irradiated with the light are observed by the eye or detected with photosensors. The volumes of the drops falling from each nozzle are adjusted based on the observation or the detection, whereby the volumes of the drops dripped from the nozzles can be made uniform.

When photosensors are employed to detect the conditions of the falling of the drops irradiated with the light, one optical sensor is arranged for a line of drops falling from each nozzle.

When a drop falls through the area irradiated with a light beam by the light irradiator, the drop obstructs the light beam and the photosensor detects it and sends a detecting signal to the controller. The controller judges whether or not the drops dripped from the respective nozzles obstruct the light beams at the same time, from the detecting signals sent by the photosensors each arranged for the lines of drops falling from the nozzles. The controller also measures the interval between an obstruction and the next obstruction for each photosensor, and the controller automatically controls the flow regulators so that the drops continually falling from the respective dripping nozzles obstruct the light beams at regular intervals.

When the light irradiator is a strobe light irradiator, the flow regulators are controlled in the following way.

The strobe light irradiator irradiates the drops falling from the nozzles with a light that flashes on and off periodically, which is called "strobe", in the same way as that explained above. When the drops dripped from the nozzles one after another are irradiated with a strobe light, the flashing frequency of which is made synchronized with the dripping frequency of the nozzles, the drops dripped from the respective nozzle are observed as if they were in a stationary state. When it is observed that the drops dripped from the respective nozzles at the same regular intervals are at the same height, all the drops dripped from the respective nozzles are considered to have the same diameter since the nozzles have the same volume. On the other hand, when it is observed that the drops dripped from the respective nozzles at the same regular intervals are not at the same height, the drops dripped from the respective nozzles are considered to have different volumes. On such occasions, the amounts of the feedstock liquid being supplied to the respective nozzles are adjusted by operating the flow regulators, so that all the drops dripped from the respective nozzles at the same regular intervals have the same diameter.

Therefore the present invention provides an apparatus for producing ADU particles that is capable of easily producing ADU particles with a uniform particle size.

The device for solidifying the surfaces of the drops recited in paragraph (14) has an ammonia gas sprayer that sprays ammonia gas over the drops of the feedstock liquid including uranyl nitrate, the drops being dripped from the single dripping nozzle or each of the dripping nozzles. Therefore the drops falling from each dripping nozzle are uniformly contacted with ammonia gas. Moreover, because the produced ADU particles do not have wave-like patterns on the surfaces thereof, the device is capable of producing uranium dioxide particles with good sphericity.

The device for solidifying the surfaces of the drops recited in paragraph (16) further has an ammonia gas discharger that discharges the ammonia gas sprayed, which enhances directivity of each stream of the ammonia gas and reduces the gas streams' mutual disturbances. These improvements further reduce the probability that wave-like patterns are formed on the surfaces of ADU particles. The ammonia gas discharger also prevents the dripping nozzles from being plugged up by the reaction of uranyl nitrate and ammonia gas at the ends of the nozzles, which is caused by the situation where the ammonia gas ascends to the ends of the nozzles when the ammonia gas discharger is not employed.

The device for solidifying the surfaces of the drops recited in paragraph (17) has the ammonia gas spraying nozzles capable of keeping the effusion of the ammonia gas constant even when the values of the pressure loss of the ammonia gas flowing through the respective nozzles are different from each other, because the flow rates of the ammonia gas sprayed from the respective nozzles are adjustable.

The device for solidifying the surfaces of drops recited in paragraph (18) has an aqueous ammonia solution reservoir that is provided with an aqueous ammonia solution discharger. When the surface of the aqueous ammonia solution, which has been raised as it has received the dripped drops, reaches a predetermined level, the aqueous ammonia solution discharger discharges the volume of the solution that is raised beyond the level by additional drops. Therefore the surface of the aqueous ammonia solution does not rise above the predetermined level. From another viewpoint, when the aqueous ammonia solution is stored in the aqueous ammonia solution reservoir so that the surface of the solution equals the predetermined level, the level the solution above which is discharged by the aqueous ammonia solution discharger, the distance between the surface of the aqueous ammonia solution and the end(s) of the nozzle(s) is kept constant. If the distance is kept constant, the conditions where the drops falling from the nozzle(s) toward the aqueous ammonia solution contact the ammonia gas are always the same. This means that the reaction between uranyl nitrate included in the drops and the ammonia gas that takes place while the drops are falling from the end(s) of the nozzle(s) to the surface of the aqueous ammonia solution is always carried out under the same conditions. Therefore the conditions under which the ammonium diuranate film is formed on the surfaces of the drops that are to hit the aqueous ammonia solution become constant, which leads to the production of uniform ADU particles without deformation.

The device for solidifying the surfaces of liquid drops recited in paragraph (19) sets the distance between the end(s) of the dripping nozzle(s) and the ends of the ammonia gas spraying nozzles to 10 mm to 40 mm, the shortest distance between the path or paths along which the drops dripped from the end(s) of the dripping nozzle(s) fall and the ends of the ammonia gas spraying nozzles to 3 mm to 15 mm. When the ammonia gas is sprayed from the ammonia gas spraying nozzle(s) at a flow rate from 3 L/min to 25 L/min under these conditions, the reaction between uranyl nitrate and ammonia takes place uniformly on the surface of each drop while the drop is falling from the end of the nozzle to the aqueous ammonia solution. When the drop reaches the surface of the solution, the drop is coated with a uniform film of ammonium diuranate. The formation of a uniform film of ammonium diuranate on the surface of each drop finally results in the production of ADU particles of uniform quality and with good sphericity.

The device for circulating an aqueous ammonia solution recited in paragraph (20) allows the ADU particles to flow upward. The ADU particles are in a state of flowing in the aqueous ammonia solution reservoir, which prevents the particles from stacking on each other. As a result, the ADU particles are protected from deformation. Also, as the reaction between ammonium ions and uranyl nitrate inside a drop flowing in the aqueous ammonia solution advances, the amount of the ammonium ions existing outside around the surface of the drop decreases. However, when the aqueous ammonia solution is in a state of flowing, ammonium ions are supplied to the surface of the drop so as to make up for the decreased amount of the ions. Furthermore, because the aqueous ammonia solution is circulated, the surface of a drop is always provided with fresh ammonium ions, which expedites the reaction between uranyl nitrate inside the drop and ammonium ions. For these reasons, ADU particles free from deformation and deficiencies in the inside structure can be produced efficiently.

The device for circulating an aqueous ammonia solution recited in paragraph (22) has a pipe for circulating the aqueous ammonia solution and a pump placed in the pipe, which makes it possible to supply the aqueous ammonia solution to the aqueous ammonia solution reservoir from a hole in the lower part of the reservoir. The aqueous ammonia solution supplied push up ADU particles on the bottom of the reservoir. This force makes the ADU particles, which are produced in the aqueous ammonia solution, flow and circulate, and does not allow them to stack on each other. Also, because the circulation of ADU particles in the circulating aqueous ammonia solution enables the surfaces of the ADU particles to contact fresh ammonium ions, ADU particles including ammonium diuranate even in the center thereof can be produced efficiently.

The device for circulating an aqueous ammonia solution recited in paragraph (23) has the member for preventing the inflow, which prevents solids, such as fragments or shreds of the particles, from flowing into the pipe for circulating the aqueous ammonia solution, and makes it possible to supply or return the circulated aqueous ammonia solution efficiently.

The device for circulating an aqueous ammonia solution recited in paragraph (24) makes it possible to take the ADU particles deposited in the bottom of the aqueous ammonia solution reservoir out to the outside of the reservoir, by the force of gravity, through the collecting pipe connected to the reservoir, without using special equipment. Also, the opening/closing device enables the operator to take the ADU particles out of the reservoir at his discretion. In the present specification, "opening the collecting pipe" means to allow the collecting pipe to communicate with the aqueous ammonia solution reservoir, and "closing the collecting pipe" means to cut off the communication between the collecting pipe and the aqueous ammonia solution reservoir.

The apparatus for producing ADU particles recited in paragraph (25) is provided with any one of the dripping nozzle device, the device for recovering a feedstock liquid, the device for supplying a feedstock liquid, the device for solidifying the surfaces of liquid drops, and the device for circulating an aqueous ammonia solution. Therefore the apparatus is capable of producing ADU particles of uniform particle size and with good sphericity.

BRIEF DESCRIPTION OF THE DRAWINGS

The figures mentioned below are not design drawings but schematic diagrams to illustrate the functions and structures of the devices, such as the dripping nozzle device, and the apparatus for producing ADU particles.

FIG. 16 is an illustration showing an array of pulse signals.

BEST MODE TO CARRY OUT THE INVENTION

First Embodiment

Figure 1:
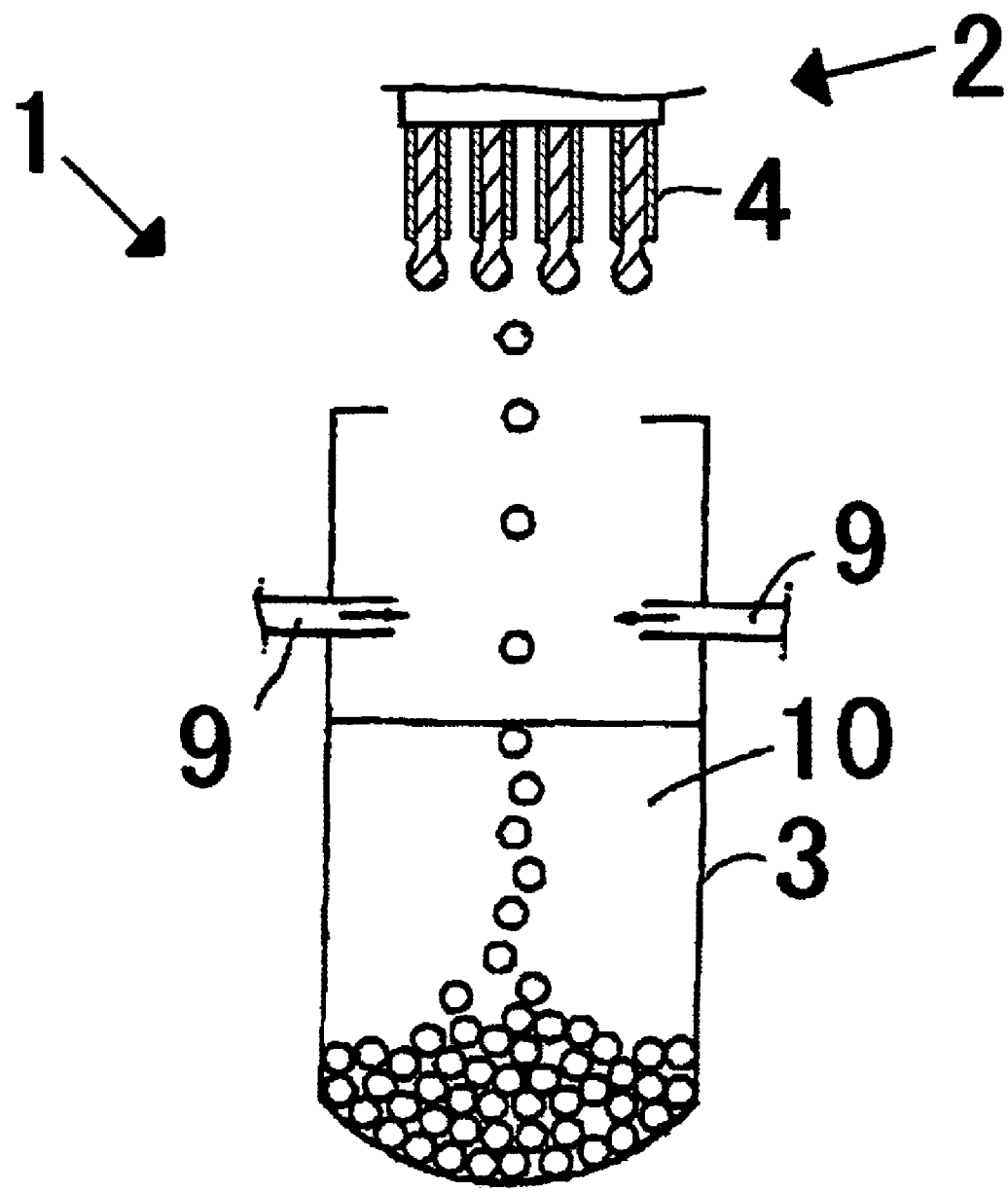
FIG. 1 is a partial diagrammatic view showing an apparatus for ADU particles, which is an example of the present invention.

FIG. 1 shows a first embodiment of the apparatus for producing ADU particles equipped with the dripping nozzle device according to the present invention.

As shown in FIG. 1, the apparatus for producing ADU particles 1 includes a dripping nozzle device 2, and an aqueous ammonia solution reservoir 3.

Figure 2:
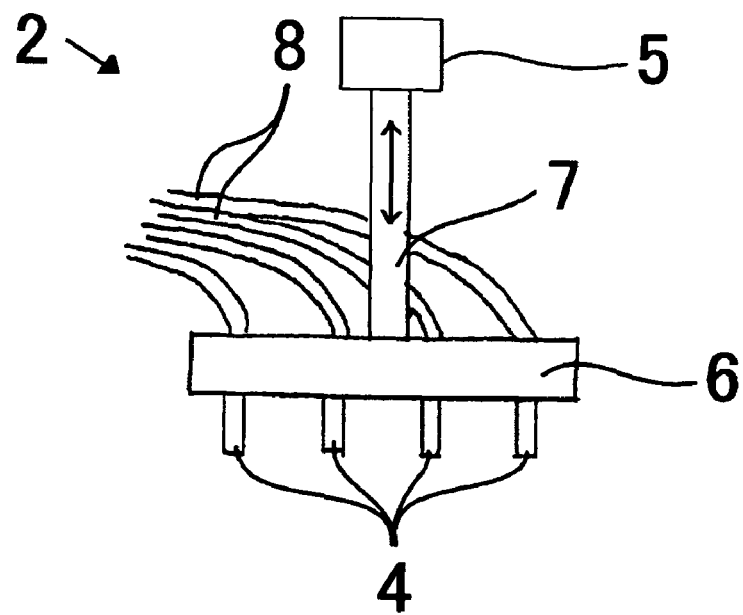
FIG. 2 is a view showing an example of the vibrating nozzles with which the apparatus for producing ADU particles according to the present invention is provided.

The dripping nozzle device 2 has several nozzles, for example four nozzles as shown in FIG. 1, and a single vibrator 5 as shown in FIG. 2. In more detail, as shown in FIG. 2, the dripping nozzle device 2 has four nozzles 4, all of which have the same shape of a cylindrical tube, and which four nozzles are vertically arranged at equal spaces with being parallel to each other; a holder 6 for holding the nozzles 4; a holding rod 7 that holds the upper ends of the respective nozzles 4 at the lower end thereof; a vibrator 5 for giving vertical vibration to the nozzles 4 through the holding rod 7; and feedstock liquid supplying pipes 8, an example of the feedstock liquid transferring passage, connected with each of the nozzles 4.

A nozzle 4 has a tubular shape. The section of the nozzle 4, obtained by cutting the nozzle by a plane perpendicular to the axis of the nozzle, may have a shape of a circle, an ellipse, or a polygon, with a circle preferred. The horizontal section of the opening of the nozzle 4 preferably has a circle with an inner diameter of 0.2 mm to 3 mm. If the inner diameter is less than 0.2 mm, the nozzle may be plugged up. On the other hand, when the inner diameter exceeds 3 mm, each of the drops becomes too large, which may result in ADU particles with a too large particle size. The nozzle 4 may be made of any material, as long as it is not adversely affected by the feedstock liquid including uranyl nitrate and it has anticorrosion. Examples of the material include glass, stainless steel, aluminum, aluminum alloy, magnesium, magnesium alloy, zirconium, and zirconium alloy.

The four nozzles 4 may be aligned as shown in FIG. 1, or may be arranged in other ways, for example in such a way that the four nozzles 4 are fixed at the respective vertices of a square virtually formed on a plane.

As shown in FIG. 2, the feedstock liquid supplying pipes 8, which are connected with the nozzles 4 respectively, are connected to a tank that stores the feedstock liquid, which tank is not shown in this figure. The feedstock liquid stored in the tank is sent to the nozzles 4 by an appropriate feedstock liquid transferring means such as a pump. The feedstock liquid may be prepared by, for example, dissolving uranium oxide powder in nitric acid to produce a uranyl nitrate solution, mixing the uranyl nitrate solution with pure water and a thickening agent, such as polyvinyl alcohol resin, and stirring the obtained mixture. Examples of the thickening agent include polyvinyl alcohol, resins that solidifies in the presence of an alkali, polyethylene glycol, and water-soluble cellulose ether, a product of which is named "METOLOSE" produced by Shin-Etsu Chemical Co., Ltd. Properties such as the viscosity of the feedstock liquid per se are decided appropriately, depending on the desired particle size of the drops. The viscosity may be, for example, from 10 to 500 cPs at 10° C. The feedstock liquid, which has been cooled to and kept at a predetermined temperature so that the viscosity thereof has been adjusted, is sent to the nozzles 4.

The vibrator 5 is structured so as to impart longitudinal vibrations of a predetermined frequency to each nozzle 4 through the holding rod 7. The vibrations may be generated with, for example, an electromagnetic vibration generator, a mechanical vibration generator, or an ultra sonic vibration generator. The frequency of the vibrations that the vibrator 5 imparts to the nozzles 4 should be in the range of 40 Hz to 200 Hz. Although it is possible to make satisfactory drops with a predetermined particle size fall from the end openings of the nozzles 4 even when the frequency is outside the range, such drops can be produced easily when the frequency is within the range.

As shown in FIG. 1, the aqueous ammonia solution reservoir 3 is one in which ammonia included in the aqueous ammonia solution stored in the reservoir reacts with uranyl nitrate included in the drops of the feedstock liquid falling from the nozzles 4 and the reaction produces ammonium diuranate. The aqueous ammonia solution reservoir 3 has a hemisphere-like curved bottom and a cylindrical sidewall. The aqueous ammonia solution is stored in a volume up to a predetermined level in the reservoir 3. The cylindrical body is extended upward beyond the level of the aqueous ammonia solution stored in the reservoir 3. The aqueous ammonia solution reservoir 3 is provided with ammonia gas-supplying pipes 9 that are arranged on the sidewall above the level of the aqueous ammonia solution 10. The ammonia gas supplied from the ammonia gas-supplying pipes 9 makes the space over the level of the aqueous ammonia solution 10 inside the aqueous ammonia solution reservoir 3 an atmosphere of ammonia gas.

Materials for the aqueous ammonia solution reservoir 3 are not limited, as long as they have corrosion resistance, especially resistance to alkalis, heat resistance, and pressure resistance. Examples of the materials may be stainless steel, aluminum, aluminum alloy, magnesium, magnesium alloy, zirconium, and zirconium alloy.

There is no limitation on the size of the aqueous ammonia solution reservoir 3. The user may decide it at their discretion. Also, the shape of the reservoir 3 is not limited to that shown in FIG. 1. The reservoir 3 may have a variety of shapes.

The ammonia gas-supplying pipes 9 supply ammonia gas to the space inside the reservoir 3 above the level of the aqueous ammonia solution to bring about gelation on the surface of each drop dripped from the nozzles 4 before it falls into the solution.

Therefore the respective opening ends of the pipes 9 open inside the reservoir 3, and the other ends of the pipes are connected to a gas-supplying means, whish is not shown in the figures, such as a gas cylinder filled with ammonia gas.

The ammonia gas-supplying pipes 9 can be fixed to any place of the sidewall, as long as it can make the space over the level of the aqueous ammonia solution in the aqueous ammonia solution reservoir 3 filled with ammonia gas.

By using the apparatus for producing ADU particles as we have explained, ADU particles are produced in the following way.

A predetermined volume of the aqueous ammonia solution is placed in the aqueous ammonia solution reservoir 3. The feedstock liquid is allowed to fall in drops from the four nozzles 4 to the aqueous ammonia solution. During this step, vibrations of the same frequency are simultaneously applied to the four nozzles 4 by the vibrator 5, as shown in FIG. 2. As a result, when the feedstock liquids flow through the respective four nozzles 4, the respective vibrations of which are synchronized with each other, at the same flow rate, drops dripped from the nozzles have essentially the same particle size.

It is advisable to incorporate the device for solidifying the surfaces of the drops according to the present invention, which will be explained hereinafter, into the apparatus for producing ADU particles. When the device is employed, drops dripped from the nozzles 4 are sprayed with ammonia gas that spouts from the ammonia gas-feeding pipe 61 while the drops are falling from the nozzles 4 to the aqueous ammonia solution. This sprayed ammonia gas brings about gelation on part of the surface of each drop, which forms a film there. The drops, the surfaces of which are at least partially covered with the gel film, fall into the aqueous ammonia solution, and then the reaction between uranyl nitrate inside the drops with the gel film on the surfaces and ammonia proceeds further to produce ammonium diuranate.

When the dripping of a predetermined amount of the feedstock liquid is completed, the aqueous ammonia solution in the aqueous ammonia solution reservoir 3 is removed. Then, the produced ADU particles are taken out of the reservoir 3, by an appropriate method, for example, by tilting the reservoir 3, by turning the reservoir 3 upside down, by scraping the contents out of the reservoir 3, or by sucking the contents from the reservoir 3.

We have explained one example of the present invention so far. The invention is not limited to the example but can be worked with suitable modification within the scope of the gist of the invention.

For example, the vibrations applied to the dripping nozzles by the vibrator 5 are not limited to longitudinal vibrations; they may also be transversal vibrations. The number of the dripping nozzles is not limited especially. The user can decide the number of the nozzles in proportion to the size of the aqueous ammonia solution reservoir, also considering the capability of producing ADU particles. The arrangement of the dripping nozzles may also be decided appropriately.

As explained above, it is possible to form ADU particles with good sphericity by using a single vibrator to impart the same vibrations to the nozzles. In order to produce ADU particles of uniform particle size, it is also preferable to appropriately control the volumes of the drops dripped from the nozzles.

Therefore it will be preferable if the dripping nozzle device or the apparatus for producing ADU particles according to the present invention includes dripping nozzles, each of which is equipped with a flow regulator to adjust the flow rate of the feedstock liquid to be dripped.

The employment of a flow regulator for each nozzle makes it possible to control the volume of the feedstock liquid dripped from each nozzle, and to make a drop dripped from one of the nozzles have the same volume as a drop dripped from any other one of the nozzles. As a result, the dispersion of the sizes of the ADU particles can be reduced.

Figure 3:
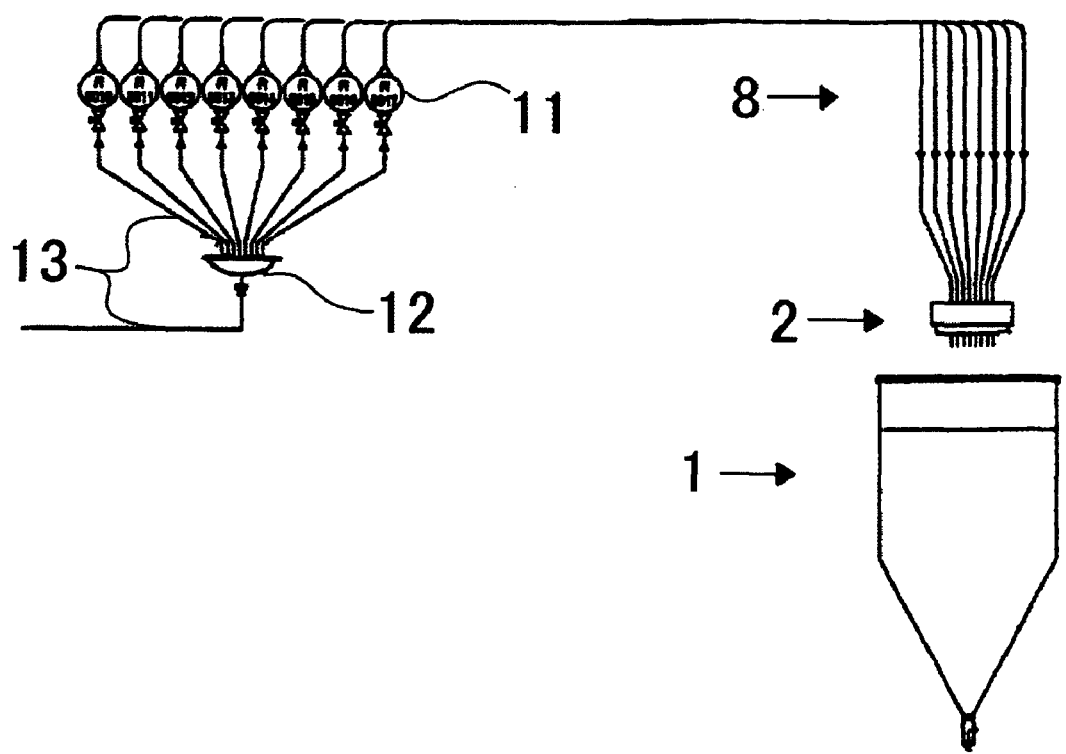
FIG. 3 is a system diagram showing an example of the apparatus for producing ADU particles according to the present invention.

FIG. 3 shows another example of the apparatus for producing ADU particles.

In FIG. 3, reference numeral 1 denotes an apparatus for producing ADU particles, 2 a dripping nozzle device, 8 feedstock liquid supplying pipes, 11 flow regulators, 12 a separator, and 13 piping. Detailed explanations of the dripping nozzle device 2 and the feedstock liquid supplying pipes 8 are omitted because they are the same as those included in the apparatus for producing ADU particles shown in FIGS. 1 and 2.

Each flow regulator 11 comprises a flow regulating valve, which is not shown in the figure, and a flowmeter, which is not shown in the figure, either. The flow regulator 11 is a device to control the flow rate of the feedstock liquid that is sent from the feedstock liquid reservoir to the corresponding dripping nozzle. The employment of the flow regulators enables the user to adjust the flow rates of the feedstock liquid by operating the flow regulating valves while s/he is viewing the heights of the respective drops dripped from the nozzles.

Each of the dripping nozzles is provided with one flow regulator 11.

Each flow regulator 11 is connected to the corresponding nozzle 4 through the corresponding feedstock liquid supplying pipe 8, and also connected to the feedstock liquid reservoir, which is not shown in this figure, through the piping 13. A known separator may be placed in the piping 13.

For the flow regulating valve may be used a known flow regulating valve, such as a globe valve, a butterfly valve, or a diaphragm pump.

Figure 4:
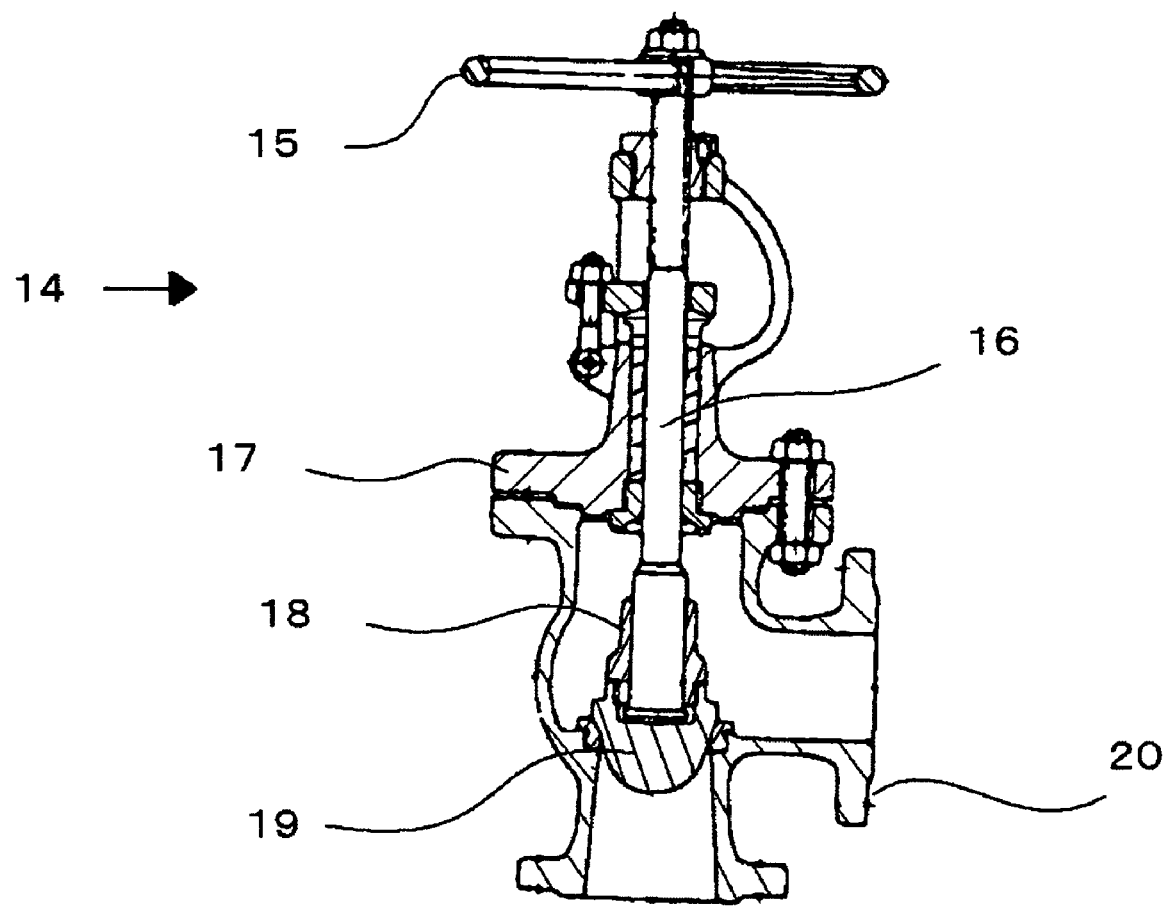
FIG. 4 is a sectional view of a globe valve, which is an example of a flow-regulating valve with which the apparatus for producing ADU particles according to the present invention is provided.

A globe valve is shown in FIG. 4 as an example of the flow-regulating valve.

The flow-regulating valve 14 shown in FIG. 4 has a handwheel 15, a valve rod 16, a cap 17, a valve guard 18, a valve 19, and a valve box 20.

The flow-regulating valve 14 is capable of controlling the flow rate so that the volumes of the feedstock liquid being sent to the respective nozzles are the same, and therefore the employment of this valve is preferable.

For the flowmeter may be used a known flowmeter, such as an area flow meter, a positive displacement flowmeter, a turbine flowmeter, or a vortex shedding flowmeter.

Materials for the piping 13 are not particularly limited, as long as they have corrosion resistance. Piping made of stainless steel, aluminum alloy, polyethylene, polypropylene, PVC, or PET may be used.

The following is an example of the method of producing ADU particles with this embodiment of the apparatus for producing ADU particles according to the present invention.

The feedstock liquid in the feedstock liquid reservoir is transferred with a pump.

The feedstock liquid is regulated to a predetermined flow rate with the flow regulator and further sent to the dripping nozzles.

This regulation adjusts the flow rate so that the flow rate of the feedstock liquid for each nozzle should be from 5 to 70 $cm^3$/minute.

When the flow rate of the feedstock liquid about to be dripped for each nozzle is less than 5 $cm^3$/minute, it takes a long time to drip such a volume of the feedstock liquid that is necessary to produce a planned amount of ADU particles, which may reduce productivity.

On the other hand, when the flow rate of the feedstock liquid about to be dripped for each nozzle exceeds 70 $cm^3$/minute, the feedstock liquid may not fall in drops but in a continuous manner. In other words, drops of the feedstock liquid may not be formed. As a result, ADU particles in the shape of a drop may not be formed but those in the shape of a rod may be formed.

The feedstock liquid that has reached each dripping nozzle falls from the nozzle 4, which is being vibrated with the vibrator 5, to the aqueous ammonia solution reservoir 3. The process and reaction in which ADU particles are formed in the reservoir 3 are the same as those made with the apparatus for producing ADU particles shown in FIG. 1.

We have explained the first embodiment so far. In the following embodiments, the number of the nozzles with which the dripping nozzle device is equipped does not need to be two or more; the number may be one. When a single nozzle is employed, the other components and members are adapted for the single nozzle. For example, when a single nozzle is used, a single flow regulator with a single flow regulating valve and flowmeter is employed.

Second Embodiment

Figure 5:
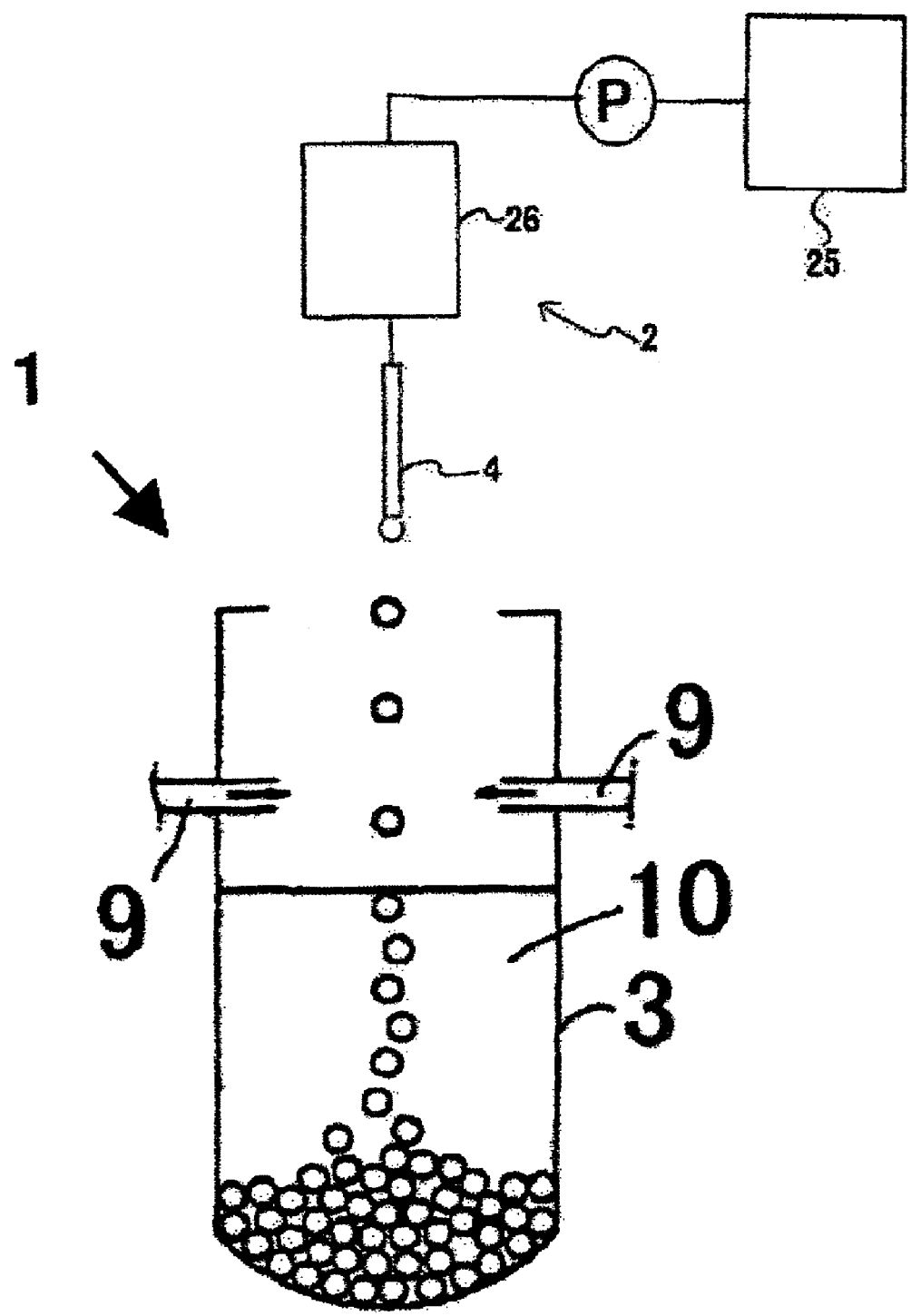
FIG. 5 is a schematic diagram showing an example of the apparatus for producing ADU particles according to the present invention.

Another embodiment of the apparatus for producing ADU particles according to the invention, which embodiment includes another example of the dripping nozzle according to the present invention is shown in FIG. 5. The apparatus for producing ADU particles of the present invention is not limited to the one shown in FIG. 5.

The apparatus for producing ADU particles 1 shown in FIG. 5 is capable of producing ADU particles from the feedstock liquid including uranyl nitrate. As shown in FIG. 5, the apparatus 1 has a dripping nozzle device 2 and an aqueous ammonia solution reservoir 3.

The dripping nozzle device 2, an example according to the present invention, is structured so that it drips the feedstock liquid in the form of a drop. As shown in FIG. 5, the device includes a nozzle or nozzles 4 from which the feedstock liquid fall in drops, and a feedstock liquid receptacle 26, which is an example of the feedstock liquid container that contains a predetermined volume of the feedstock liquid supplied from a feedstock liquid reservoir 26 in which the feedstock liquid to be transferred with a pump P is stored. The feedstock liquid receptacle 26 has a length or diameter of the horizontal section thereof larger than the inner diameter of the nozzle 4. The dripping nozzle device 4 may be equipped with the vibrator 5, which was explained in the first embodiment.

The feedstock liquid that includes uranyl nitrate is stored in the feedstock liquid reservoir 25, and a predetermined volume of it is transferred to the feedstock liquid receptacle 26 with the pump P.

The feedstock liquid receptacle 26 is designed so as to contain a predetermined volume of the feedstock liquid. Therefore the feedstock liquid is contained in the feedstock liquid receptacle 26 so that the surface of the feedstock liquid is constantly at a predetermined level in the receptacle 26. In order to achieve this condition, when the feedstock liquid is supplied in such an amount that the surface of the liquid is over the level in the receptacle 26, the receptacle 26 is provided with, for example, a discharging pipe through which the volume of the feedstock liquid that is over the level and overflowed is discharged. The discharging pipe is not shown in the figures.

The inner shape of the feedstock liquid receptacle 26 may be an approximate cylinder. If the receptacle 26 has an inner shape of the approximate cylinder, the receptacle 26 is produced easily. This easiness of the production makes most receptacles 26 have an inner shape of the approximate cylinder. However, the feedstock liquid receptacle 26 may take other inner shapes, such as a square pillar, the horizontal section of which is a square or a rectangular, a semispherical prism, the horizontal section of which is a hemisphere, or a triangular prism, the horizontal section of which is a triangle, depending on the conditions under which the dripping nozzle device 2, and the apparatus for producing ADU particles 1, into which the dripping nozzle device 2 is incorporated, are designed.

Materials for the feedstock liquid receptacle 26 should be those that neither react with the components of the feedstock liquid nor change in the volume. Examples of the materials may be glass, stainless steel, aluminum, aluminum alloy, magnesium, magnesium alloy, zirconium, and zirconium alloy.

The size of the feedstock liquid receptacle 26 with a cylindrical inner shape will be described hereinafter.

The nozzle 4 is so formed that it is capable of dripping the feedstock liquid from the end thereof. The inner shape of the nozzle 4 is typically cylindrical. The nozzle 4 may take other inner shapes, such as a square pillar, the horizontal section of which is a square or a rectangular, a semispherical prism, the horizontal section of which is a hemisphere, or a triangular prism, the horizontal section of which is a triangle, according to circumstances.

The drop dripped from this nozzle 4 is typically in the shape of a sphere with a diameter of 0.2 to 4 mm, which is the same as the drop explained in relation to the first embodiment. The droplet of the feedstock liquid that swells up into a sphere at the opening end of the nozzle 4 may sometimes be called "drop" or "spherical drip". A preferable inner diameter of the nozzle 4, when it is in the shape of a cylinder, is, typically, from 0.2 to 3 mm, in order to drip the feedstock liquid with the aforementioned viscosity in small drops. Although the nozzle 4 is usually a straight pipe, it may also be a bend according to circumstances. Since one of the problems to be solved by the present invention is to prevent the drops that are dripped from the opening end of the nozzle 4 from having various diameters as a result of the influence of pressure loss, the distance of the nozzle 4 through which the feedstock liquid passes should not be long. From this point of view, the axial length of the nozzle 4, which is a straight pipe, should preferably be from 0.1 to 2 cm. When the axial length thereof exceeds 2 cm, the feedstock liquid sometimes has to be pushed out from the opening end of the nozzle 4 by applying pressure, which makes the device complicated. On the other hand, when the axial length of the nozzle 4 is less than 0.1 cm, the feedstock fluid may not be dripped smoothly from the opening end of the nozzle 4.

The nozzle 4 may be directly connected to the bottom of the feedstock liquid receptacle 26, or the other end of the nozzle 4 may communicate with the receptacle 26 through a connecting pipe, which is not shown in the figures. In order to decrease the pressure loss as much as possible, the distance between the feedstock liquid reservoir 26 and the opening end of the nozzle 4 has to be short, which means that the rear end of the nozzle 4 should be directly connected to the feedstock liquid receptacle 26. The term "directly connected" means that the rear end of the nozzle 4 is located at the outlet of the receptacle 26. As long as the nozzle 4 is directly connected to the receptacle 26 in this sense, the feedstock liquid receptacle 26 and the nozzle 4 may be formed integrally, or they are made separately and then mechanically connected with each other.

Materials for the nozzle 4 are the same as those described in the first embodiment.

Figure 7:
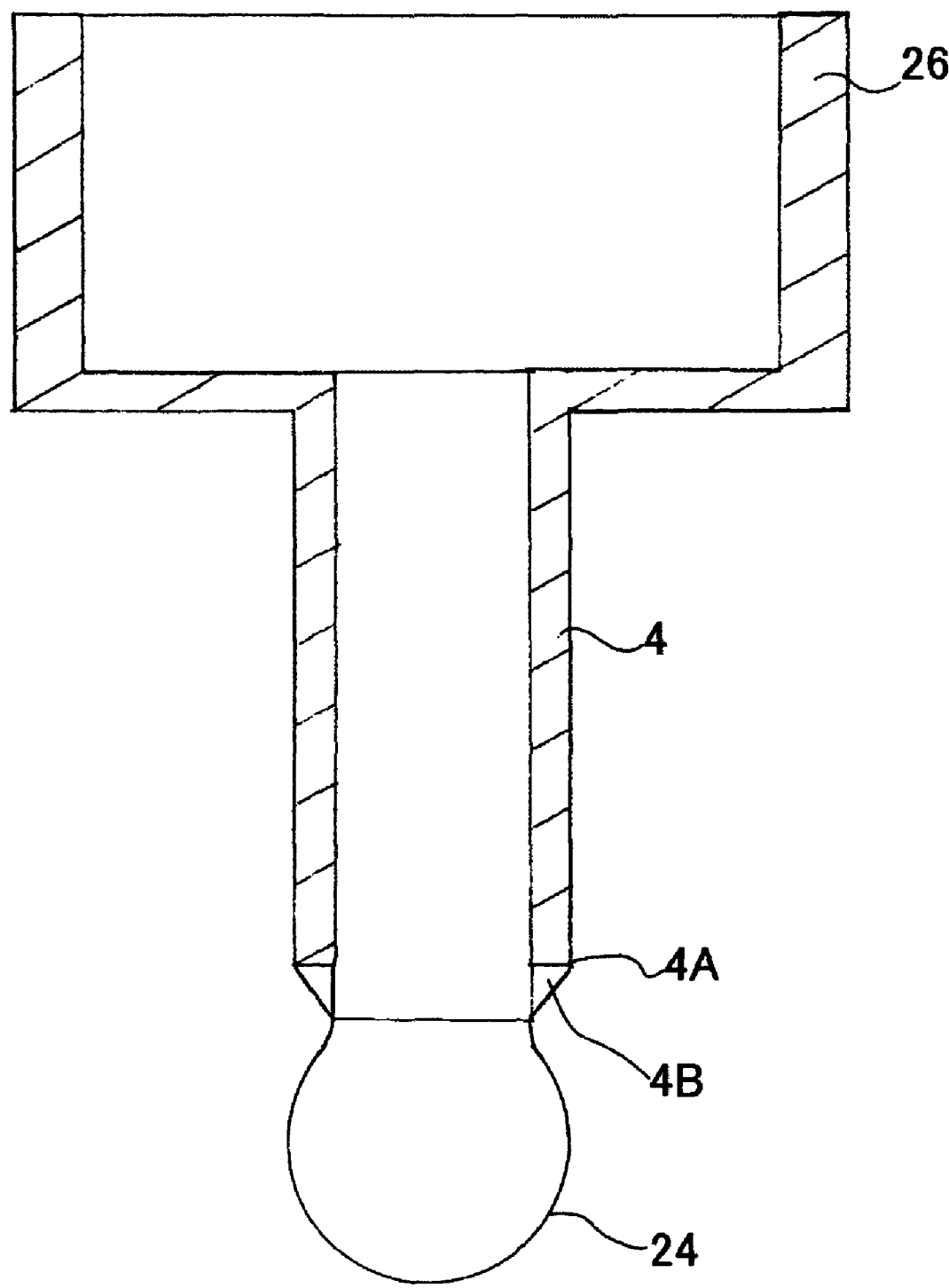
FIG. 7 is an enlarged view of a part of the dripping nozzle device that has an edge at the end of the nozzle, according to the present invention.

The opening end 4A of the nozzle 4 should preferably be provided with an edge 4B, an example of which is shown in FIG. 7. The recommendation that the opening end of the nozzle be provided with an edge is not limited to the nozzle of this example but applied to all the nozzles of the dripping nozzle device according to the present invention. The edge 4B has a function to expedite the separation of a drop 24, which is formed at the opening end of the nozzle 4, from the opening end 4A. In other words, the edge realizes a sharp or smooth separation, when the drop 24 is separated from the end of the nozzle 4. Although rational reasons for the separation expedient of the edge 4B has not be determined, we assume that the area of the end of the nozzle 4 to which the drop 24 adheres is reduced when the end is provided with the edge 4B, which results in a reduction in the force that keeps the drop 24 from falling. The edge 4B preferably has the shape of a ring formed along the opening end of the nozzle 4, the vertical section of which ring is in the shape of a wedge that the outer peripheral face of the nozzle 4 converges toward the inner face thereof. The edge may also be in a saw-toothed shape.

With the feedstock fluid receptacle 26 and the nozzle 4 designed as explained above can be formed at the opening end of the nozzle 4 drops with a predetermined diameter, which leads to the achievement of the objective, that is, to constantly produce ADU particles of uniform particle size.

A single nozzle 4 may be connected to the single feedstock liquid receptacle 26, or several nozzles 4 to the single feedstock liquid receptacle 26.

The aqueous ammonia solution reservoir 3 in this embodiment has the same structure as the reservoir 3 in the first embodiment.

As shown in FIG. 5, the aqueous ammonia solution reservoir 3 is provided with ammonia gas-supplying pipes 9.

In the followings, the functions of the dripping device and the apparatus for producing ADU particles into which the dripping device is incorporated will be explained.

In the initial state, a predetermined amount of an aqueous ammonia solution is stored in the aqueous ammonia solution reservoir 3. An atmosphere of ammonia gas is created, with the ammonia gas-supplying pipes 9, over the surface of the aqueous ammonia solution in the reservoir 3.

The feedstock liquid is transferred from the feedstock liquid reservoir 25 to the feedstock liquid receptacle 26 with the pump P. The receptacle 26 contains a predetermined volume of the feedstock liquid. The feedstock liquid in the feedstock liquid receptacle 26 is sent to the nozzle 4. The feedstock liquid falls in drops from the opening end of the nozzle 4.

In this process, a droplet 24, which gradually swells because of the feedstock liquid flowing down out of the opening end of the nozzle, is formed. When the weight of the droplet 24 exceeds the force that allows the drop to stick to the opening end, the swollen droplet 24, or a drop, falls. While the droplet 24 formed at the opening end of the nozzle 4 grows until it falls from the nozzle, a constant hydrostatic pressure, produced by the feedstock liquid contained in the feedstock liquid receptacle 26, is applied to the droplet. Also, the pressure loss between the feedstock liquid receptacle 26 and the nozzle 4 is small. These factors make the drops falling from the opening end of the nozzle 4 have the same planned volume.

The feedstock liquid receptacle 26 is replenished with the feedstock liquid sent from the feedstock liquid reservoir 25 with the pump P for the volume of the drop that fell. When the volume of the feedstock liquid contained in the feedstock liquid receptacle 26 exceeds a predetermined volume, the excessive volume of the feedstock liquid is discharged from a discharging outlet that is not shown in the figures. Therefore the feedstock liquid receptacle 26 always contains the predetermined volume of the feedstock liquid even after a volume of the liquid is discharged as a drop from the nozzle 4, which makes it possible to give a constant hydrostatic pressure to the opening end of the nozzle 4.

Drops dripped from the nozzle 4 fall toward the aqueous ammonia solution in the aqueous ammonia solution reservoir 3.

The surfaces of the falling drops are subjected to gelation in an atmosphere of ammonia gas over the surface of the aqueous ammonia solution. The gelation is to make a film of ammonium diuranate by the reaction between uranyl nitrate on the surfaces of the drops and ammonia gas. As a result, the film can prevent the drops from being deformed, to some extent, by the impact given to them when they collide with the surface of the aqueous ammonia solution.

Uranyl nitrate inside the drops that have fallen into the aqueous ammonia solution in the aqueous ammonia solution reservoir 3 reacts with ammonia, and ammonia diuranate is produced inside the drops.

The ADU particles produced in the aqueous ammonia solution reservoir 3 are taken out of the reservoir by an appropriate method.

The following is a working example of the production of ADU particles with the dripping nozzle device shown in FIG.

5 and the apparatus for producing ADU particles into which the dripping nozzle device is incorporated.

Working Example 1

Figure 6:
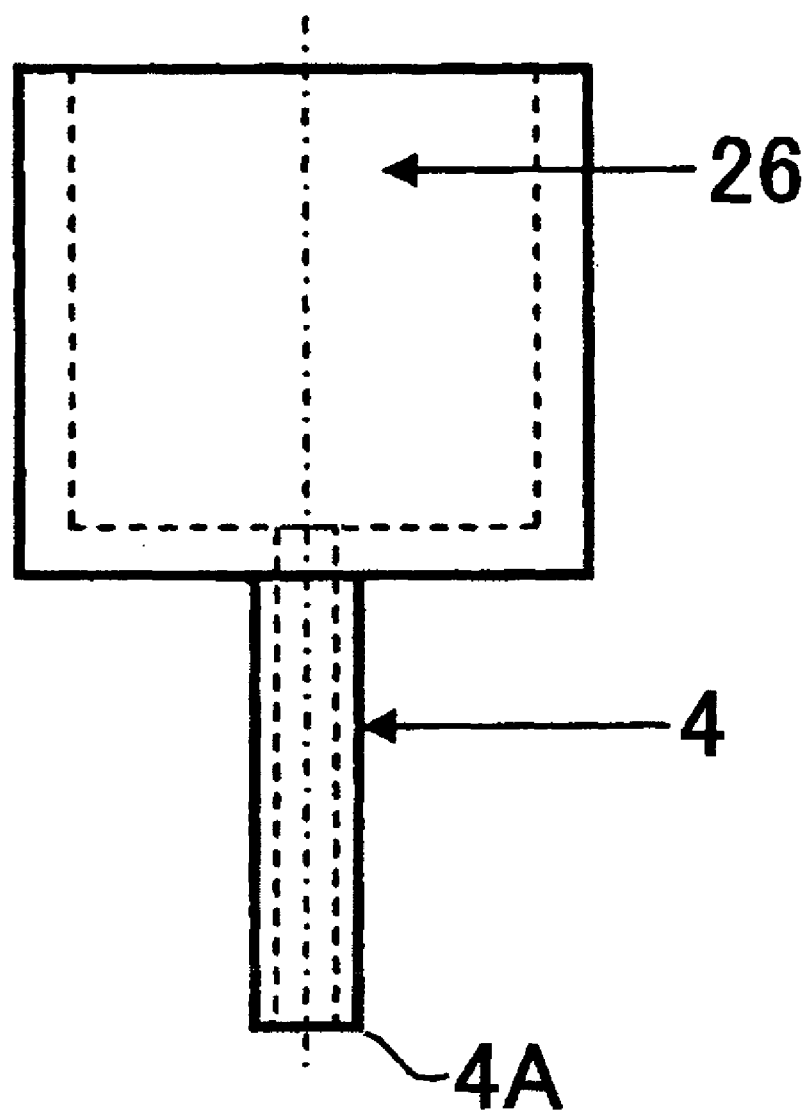
FIG. 6 is a schematic diagram showing an example of the dripping nozzle device according to the present invention.

The dripping nozzle device 2 shown in FIGS. 5 and 6 was employed. The nozzle 4 was in the shape of a cylinder with an inner diameter of 0.5 mm and a length of 15 mm. The feedstock liquid receptacle 26 was also in the shape of a cylinder with an inner diameter of 6 mm and a length of 12 mm. A feedstock liquid was prepared by dissolving uranium oxide in nitric acid to produce a uranyl nitrate solution, and mixing the uranyl nitrate solution with polyvinyl alcohol resin and other chemicals. The viscosity of the feedstock liquid was about 60 cP. The uranium content of the liquid including uranyl nitrate was 0.7 mol-U/L.

The feedstock liquid contained in the feedstock liquid receptacle 26 was dripped from the opening end of the nozzle 4 into an aqueous ammonia solution in the aqueous ammonia solution reservoir 3. The ammonia content of the aqueous ammonia solution was 25% by volume.

After the reaction between uranyl nitrate included in the feedstock liquid and ammonia to produce ammonium diuranate advanced sufficiently and ADU particles were prepared, the ADU particles were taken out of the aqueous ammonia solution reservoir 3.

Uranium dioxide fuel kernels were produced from the ADU particles by a known method. The uranium dioxide fuel kernels had an average diameter of 600 μm, and the standard deviation of the diameters was not more than 10 μm. Also, the fuel kernels had good sphericity.

Third Embodiment

The third embodiment is an example of the dripping nozzle device including a feedstock liquid supplier for supplying the feedstock liquid to at least one dripping nozzle, from which the feedstock liquid falls in drops, substantially at a constant rate and without pulsation, and the apparatus for producing ADU particles into which the dripping nozzle device is incorporated.

Figure 8:
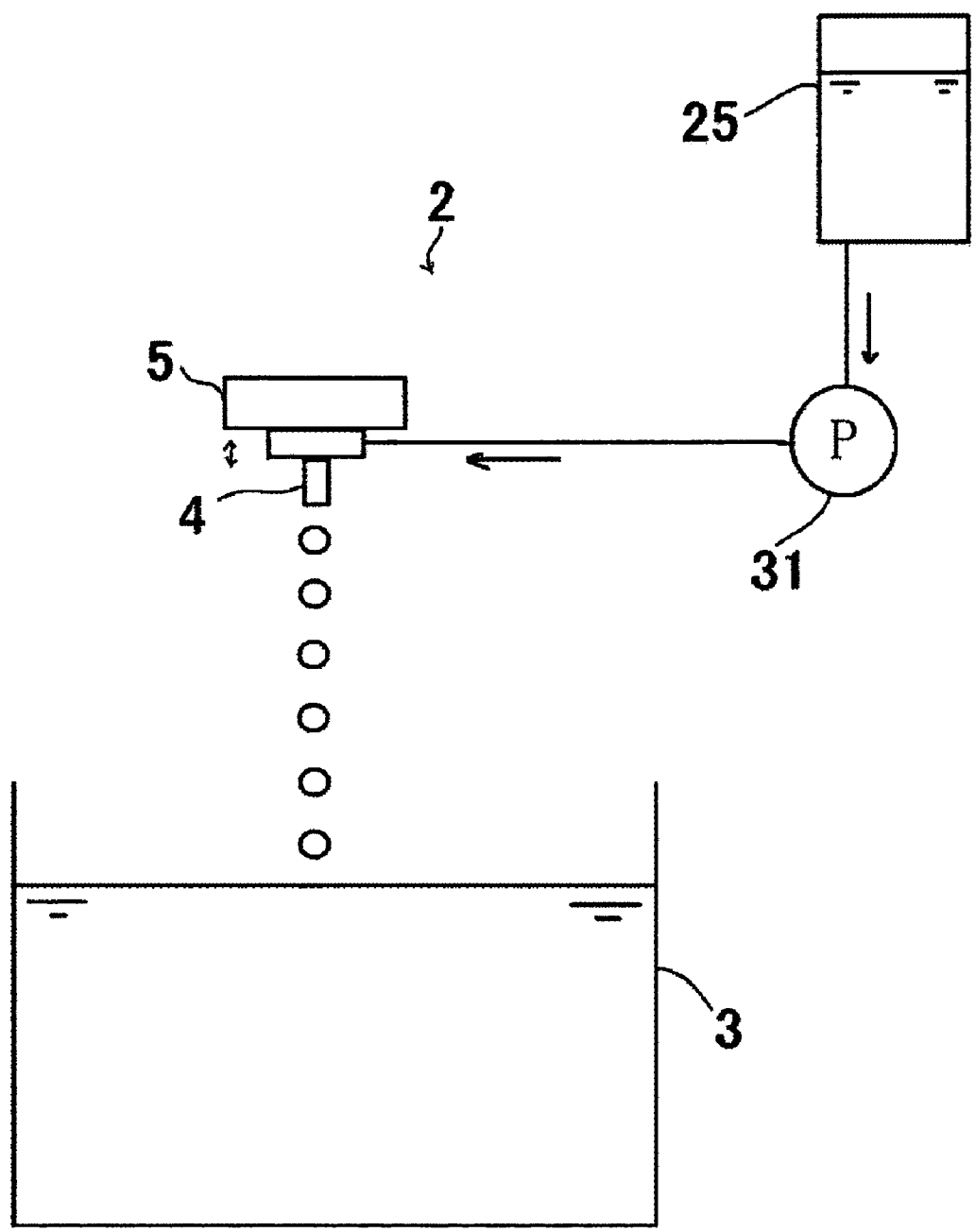
FIG. 8 is a schematic diagram of the dripping nozzle device according to the present invention.

In the followings, referring to FIG. 8, we are going to explain the dripping nozzle device 2, which device is an embodiment according to the present invention. Needless to say, the dripping nozzle device 2 shown in FIG. 8 is merely an example of the present invention, and the dripping nozzle device of the present invention is not limited to the device 2 shown in FIG. 8.

The dripping nozzle device 2 has a nozzle 4, a vibrator 5, and a feedstock liquid supplier 31.

The nozzle 4 and the vibrator 5 are the same as those explained in relation to the first and second embodiments.

The feedstock supplier 31 is so designed that it is capable of supplying liquid to the dripping nozzle substantially without pulsation and at a constant rate. An example of the feedstock liquid supplier 31 may be a plunger-type metering pump.

The feedstock liquid supplier 31 is connected with the feedstock liquid reservoir 25 in which the feedstock liquid is stored. The feedstock liquid is the same as that explained in relation to the first and second embodiments.

The frequency of the vibrations applied to the nozzle 4 with the vibrator 5, and the flow rate of the feedstock liquid pumped with the feedstock liquid supplier 31 have the relationship represented by equation (1):

$$d^3 = KQ/f \quad (1)$$

In equation (1), "d" denotes the particle size of a drop falling from the nozzle 4, "f" the frequency of the vibrations applied to the nozzle 4 with the vibrator 5, "Q" the flow rate of the feedstock liquid supplied by the feedstock liquid supplier 31, and "K" is a constant. In order to satisfy the relationship represented by this equation and to keep the particle sizes of the drops falling from the nozzle constant, it is necessary to prevent the flow rate of the feedstock liquid supplied by the feedstock liquid supplier 31 from fluctuating. In other words, the feedstock liquid is so sent to the nozzle 4 by the feedstock liquid supplier 31 that equation (1) is satisfied. The particle size of a drop falling from the nozzle 4 is adjusted by the flow rate of the feedstock liquid supplied by the feedstock liquid suppler 31 without pulsation and the frequency of the vibrations applied to the nozzle 4 by the vibrator 5.

For example, the frequency of the vibrations generated by the vibrator 5 is typically from 40 to 150 Hz. The flow rate of the feedstock liquid pumped with the feedstock liquid supplier 31 is, for example when the number of the nozzles is eight, preferably from 0.1 to 1 L/minute.

The operation of the apparatus for producing ADU particles according to this embodiment will be explained in the followings.

The viscosity of the feedstock liquid including, for example, uranyl nitrate and additives, such as a thickening agent, the uranium content of which is from 0.7 to 0.9 mol-U/L, is adjusted by cooling in the feedstock liquid reservoir 25. After the adjustment, the feedstock liquid is dripped into the aqueous ammonia solution in the aqueous ammonia solution reservoir 3 with the dripping nozzle device 2 according to the present invention.

In this process, the feedstock liquid is sent from the feedstock liquid reservoir 25 to the nozzle 4 with the feedstock liquid supplier 31 at a constant flow rate without pulsation. The nozzle 4, to which the feedstock liquid has been sent, is given vibrations of a predetermined frequency with the vibrator 5. From the nozzle 4, which is being given the vibrations, fall drops with a same particle diameter.

The drops falling toward the aqueous ammonia solution in the aqueous ammonia solution reservoir 3 may pass through an atmosphere of ammonia gas before reaching the surface of the solution, in the same way as in the first and second embodiments. In the aqueous ammonia solution, uranyl nitrate included in the drops sufficiently reacts with ammonia, and the drops turn to ADU particles.

A working example and a comparative example related to the third embodiment will be presented in the followings.

Working Example 2

A uranyl nitrate-including solution was prepared by mixing a uranyl nitrate solution with a water-soluble cyclic ether, such as tetrahydrofurfuryl alcohol, which may be abbreviated to "THFA" hereinafter. On the other hand, an aqueous water-soluble polymer solution, the concentration of which was 7.3% by weight, obtained by mixing a water-soluble polymer, for example, polyvinyl alcohol, with water, was further mixed with a water-soluble cyclic ether, such as tetrahydrofurfuryl alcohol, so that a water-soluble polymer solution was prepared. Then a feedstock liquid was prepared by mixing the uranyl nitrate-including solution with the water-soluble polymer solution. The THFA content of the prepared feedstock liquid was 45% by volume based on the entire volume of the feedstock liquid, and the concentration of the aqueous water-soluble polymer solution in the feedstock liquid was 17% by volume based on the entire volume of the liquid. The mixing ratio of the aqueous water-soluble polymer solution to THFA in the water-soluble polymer solution was such that the amount of THFA was 37% by volume based on the total volume of THFA in the feedstock liquid. The uranium content of this feedstock liquid was 0.76 mol-U/L.

Then, with a non-pulsation metering pump, which was a product by Fuji Techno Industries Corporation, as feedstock liquid supplier 31, the feedstock liquid prepared with the above-mentioned composition was sent from the feedstock liquid reservoir 25 to eight nozzles 4 without pulsation at a constant flow rate of 0.2 L/minute. The nozzles 4, to which the feedstock liquid has been sent, were given vibrations of 75 Hz by the vibrator 5. From the nozzles 4, which were being given the vibrations, drops with a same diameter fell.

The drops, which had fallen into an aqueous ammonia solution in the aqueous ammonia solution reservoir 3, reacted with ammonia sufficiently, and ADU particles were produced.

The ADU particles were aged, washed and dried. Then the dried ADU particles were calcined in the atmosphere at 500° C., which produced uranium trioxide particles. The uranium trioxide particles were reduced and sintered in a stream of hydrogen, which turned the uranium trioxide particles to uranium dioxide particles with a high density and with an appearance of ceramics.

The uranium dioxide particles were classified with a sieve having a sieve opening of 625 μm and with a sieve having a sieve opening of 575 μm. As a result of this classification, the uranium dioxide particles with a particle size between 575 μm and 625 μm were not less than 99.5% of the entire uranium dioxide particles.

The average particle size of the uranium dioxide particles produced in this working example was 600 μm. The average particle size was measured by the PSA method.

Figure 9:
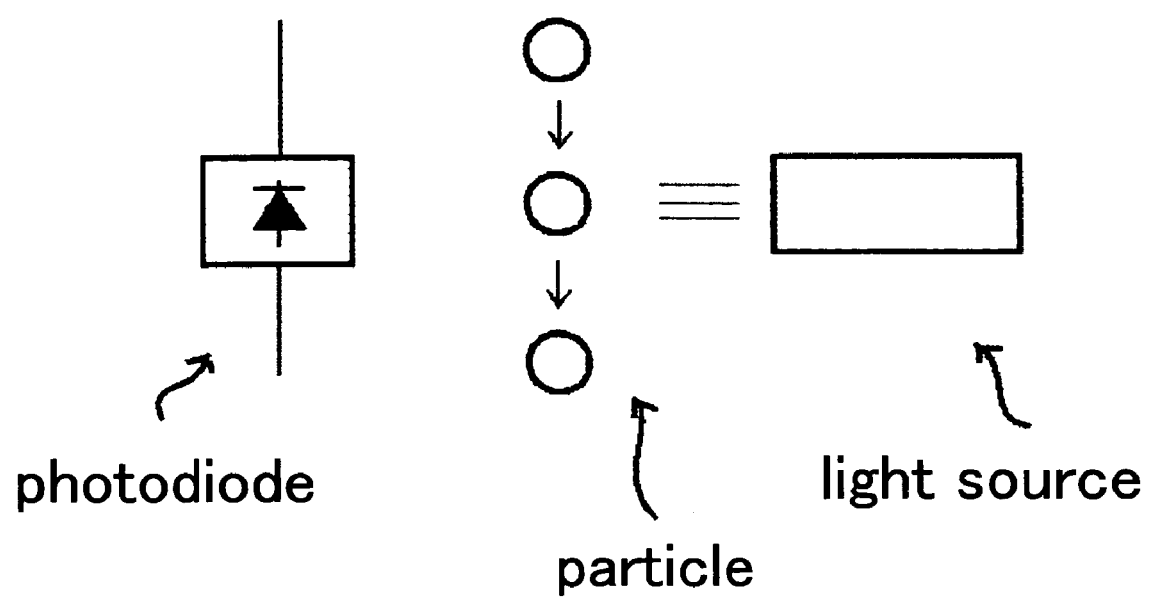
FIG. 9 illustrates a method of measuring the particle size of a uranium dioxide particle.

The PSA method is, as illustrated in FIG. 9, is a method using a photodiode, a slit, and a light source. A light beam emitted from the light source passes through the slit to a uranium dioxide particle, and the shadow of the drop moving between the photodiode and the slit is detected with the photodiode. The diameter of the particle is calculated from the shadow detected with the photodiode. The average particle was obtained by carrying out the measurement with many particles.

Comparative Example 1

The steps in this comparative example were the same as those in Working Example 2, except that a tubing pump, a product by Furue Science Corporation, was used in place of the non-pulsation pump produced by Fuji Techno Industries Corporation, as feedstock liquid supplier 31. The average flow rate by means of this tubing pump was 0.2 L/minute.

The uranium dioxide particles produced in this comparative example were classified with a sieve having a sieve opening of 625 μm and with a sieve having a sieve opening of 575 μm. As a result of this classification, the uranium dioxide particles with a particle size between 575 μm and 625 μm were less than 10% of the entire uranium dioxide particles.

The average particle size of the uranium dioxide particles produced in this comparative example was 600 μm. The average particle size was measured by the PSA method, which was explained above.

Fourth Embodiment

Figure 10:
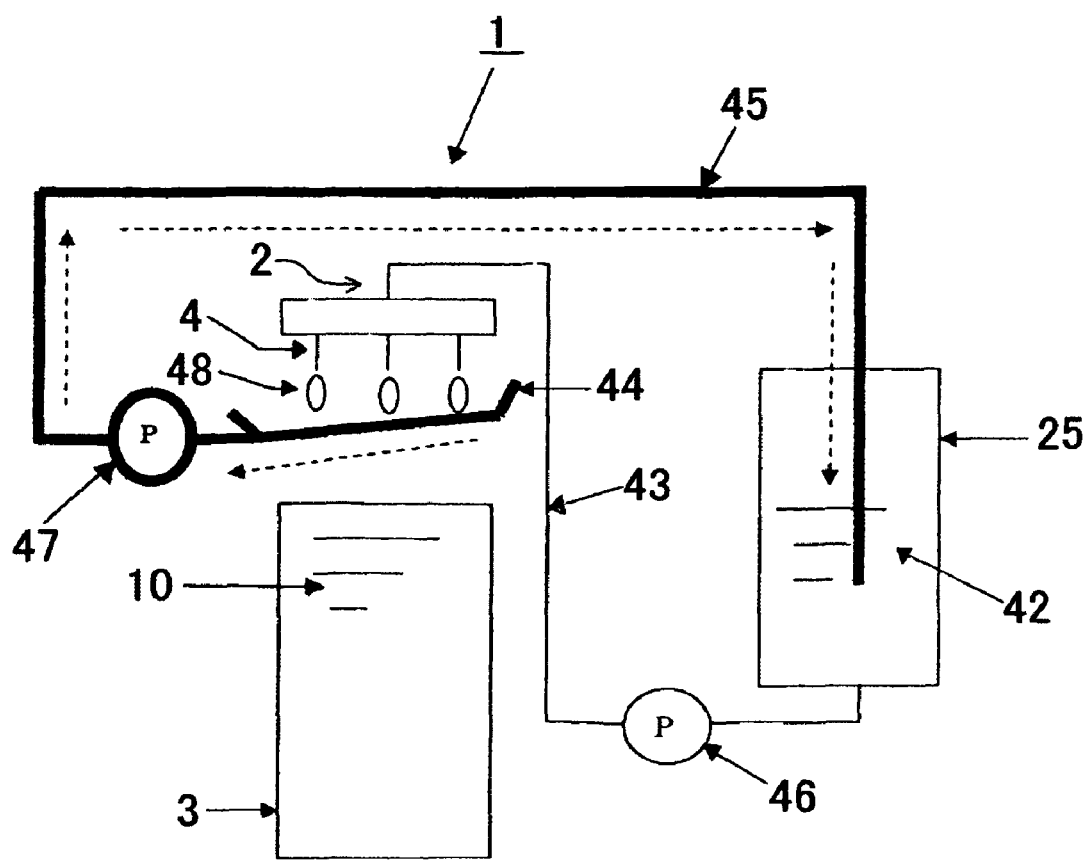
FIG. 10 is a view showing an example of the apparatus for producing ADU particles according to the present invention.

FIG. 10 shows an example of the device for recovering a feedstock liquid and the apparatus for producing ADU particles into which the device is incorporated. In the fourth embodiment, the apparatus for producing ADU particles is an apparatus for a batchwise operation that includes a feedstock liquid reservoir in which a feedstock liquid including uranyl nitrate is stored, a dripping nozzle device that drips the feedstock liquid to an aqueous ammonia solution, a feedstock liquid transferring passage through which the feedstock liquid is sent from the feedstock liquid reservoir to the dripping nozzle device, an aqueous ammonia solution reservoir in which the aqueous ammonia solution is stored, and the device for recovering the feedstock liquid. The device for recovering the feedstock liquid can be incorporated into embodiments of the apparatus for producing ADU particles other than the fourth embodiment. Also, for the dripping nozzle device can be used the examples of the dripping nozzle device that were explained in relation to the first to third embodiments.

The device for recovering the feedstock liquid has a remaining feedstock liquid collector, placed between the dripping nozzle device and the aqueous ammonia solution reservoir, for receiving a remainder of the feedstock liquid remaining in the feedstock liquid transferring passage after the previous batchwise operation; and a feedstock liquid remainder transferring passage that connects the remaining feedstock liquid collector with the feedstock liquid reservoir, for transferring the remainder to the feedstock liquid reservoir.

The apparatus for producing ADU particles shown in FIG. 10, which is an example of the present invention, will be explained based on the figure.

FIG. 10 shows an example of the apparatus for producing ADU particles according to the present invention. The apparatus for producing ADU particles 1 is an apparatus for a batchwise operation that includes a feedstock liquid reservoir 25 in which a feedstock liquid 42 including uranyl nitrate is stored, a dripping nozzle device 2 with nozzles 4 from which the feedstock liquid 42 falls in drops to an aqueous ammonia solution 10, a feedstock liquid transferring passage 43 through which the feedstock liquid 42 is sent to the dripping nozzle device 2, an aqueous ammonia solution reservoir 3 in which the aqueous ammonia solution 10 is stored. The apparatus further includes a remaining feedstock liquid collector 44, placed between the dripping nozzle device 2 with the nozzles 4 and the aqueous ammonia solution reservoir 3, for receiving drops 48 formed from the feedstock liquid remaining in the feedstock liquid transferring passage 43 after the previous batchwise operation; and a feedstock liquid remainder transferring passage 45 that connects the remaining feedstock liquid collector 44 with the feedstock liquid reservoir 25, for transferring the feedstock liquid remaining in the feedstock liquid transferring passage 43 back to the feedstock liquid reservoir 25. Reference numeral 46 denotes a pump for sending the feedstock liquid, and 47 a pump for returning the remaining feedstock liquid. The arrow in the dotted line shows the direction in which the remaining feedstock liquid is transferred. The feedstock liquid reservoir 25 has a temperature-controlling function, the mechanism for which is not shown in the figures.

Figure 11:
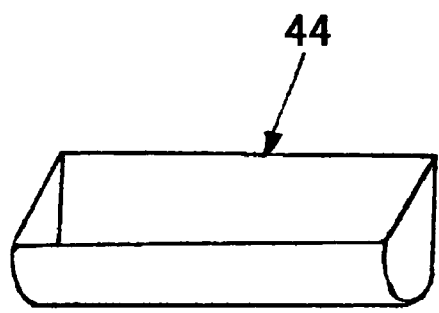
FIG. 11 is a view showing an example of the remaining feedstock liquid collector used in the device or apparatus according to the present invention.

The remaining feedstock liquid collector 44 may be in any shape as long as it is capable of receiving drops 48 of the remaining feedstock liquid. For example, the collector may be in the shape of a tub as shown in FIG. 11. Also, the remaining feedstock liquid collector should be placed with a slight gradient so that the collected remaining feedstock liquid can be returned smoothly, as shown in FIG. 10. The feedstock liquid remainder received in the remaining feedstock liquid collector 44 is sent back to the feedstock liquid reservoir 25 with the pump 47.

With the apparatus for producing ADU particles 1, ADU particles are produced in the following way.

The feedstock liquid 22 including uranyl nitrate is sent from the feedstock liquid reservoir 25, through the feedstock liquid transferring passage 43, to the dripping nozzle device 2 with the pump for sending the feedstock liquid 46. Then, the feedstock liquid 42, which has been sent to the dripping nozzle device 2, falls in drops 48 from the nozzles 4 to the aqueous ammonia solution 10. Uranyl nitrate included in the drops and ammonia thus react in the aqueous ammonia solution reservoir 3, and ADU particles are produced. When a predetermined amount of the ADU particles accumulate in the aqueous ammonia solution reservoir 3, the falling of drops 48 from the nozzles 4 is stopped. As mentioned above, this apparatus for producing ADU particles is operated in a batchwise manner.

The batch production of ADU particles was finished as described above, and then a new batch production is started. At this time, a remainder of the feedstock liquid in the feedstock liquid transferring passage 43 from the previous batch production is pushed out by sending a fresh feedstock liquid 42, prepared for the new batch, into the feedstock liquid transferring passage 43.

The remainder of the feedstock liquid pushed by the fresh feedstock liquid 42 is transferred to the dripping nozzle device 2 with the nozzles 4 in the apparatus for producing ADU particles 1 shown in FIG. 10, and then falls in drops 48 from the nozzles 4. The drops 48 are received by the remaining feedstock liquid collector 44. The feedstock liquid remainder collected in the remaining feedstock liquid collector 44 is returned to the feedstock liquid reservoir 25 through the feedstock liquid remainder transferring passage 45 with the pump 47 for returning the remaining feedstock liquid, and mixed with the fresh feedstock liquid.

The new batch production of ADU particles is restarted by using the feedstock liquid 42 that has been prepared by the mixing and cooling, if necessary, with the apparatus for producing ADU particles 1. Before the restart, the feedstock liquid 42 is prepared by mixing the feedstock liquid remainder with the fresh feedstock liquid and adjusting the temperature of the mixture, which is followed by a detachment of the remaining feedstock liquid collector 44 or a shifting thereof so that the collector 44 does not obstruct the falling of the feedstock liquid 8 dripped from the nozzles 4 to the aqueous ammonia solution reservoir 3.

Thus, ADU particles are produced in the second batch operation after the termination of the first batch production. Subsequently, the third batch operation, the fourth batch operation, and the forthcoming operations can be carried out. ADU particles can be produced repeatedly in this way.

With the apparatus for producing ADU particles according to the present invention, the feedstock liquid including uranyl nitrate remaining in the feedstock liquid transferring passage from the previous batch operation, the temperature of which feedstock liquid is not adjusted, is mixed with the feedstock liquid for a new batch operation, the temperature of the mixture is adjusted, and then the mixture is dripped to the aqueous ammonia solution so that ADU particles are produced. Therefore, uranium dioxide particles, produced from the ADU particles through the steps of aging, washing, drying, calcining, reducing, and sintering, have no problems; they are particles with good sphericity, of substantially uniform particle size, and with a flawless inside structure. With the apparatus according to the present invention, ADU particles of uniform quality, which lead to such excellent uranium dioxide particles, can be produced at a high yield. The apparatus is very useful for the production of fuels for high-temperature gas reactors.

This embodiment of the present invention is described further in detail by way of examples. The present invention is never limited to these examples.

Working Example 3

A uranyl nitrate solution was prepared by dissolving 5 kg of powdery $U_3O_8$ in 3.3 L of a 60% by weight nitric acid. To 7.5 L of the prepared uranyl nitrate solution were added an aqueous polyvinyl alcohol solution and tetrahydrofurfuryl alcohol as a thickening agent so that the amount of the former was 17% by volume and that of the latter 45% by volume based on the feedstock liquid prepared in this step. Thus, 24 L of the feedstock liquid was prepared. After 120 minutes from the preparation, the uranium content of this feedstock liquid was 180 g/L, the temperature thereof was 12° C., and the viscosity thereof was $56 \times 10^{-3}$ Pa·s (56 cP).

The feedstock liquid thus prepared was stored in the feedstock liquid reservoir 25 of the apparatus for producing ADU particles 1 as feedstock liquid 42. The feedstock liquid 42 was sent to the dripping nozzle device 2 with nozzles 4 through the feedstock liquid transferring passage 43 with the feedstock liquid-sending pump 46. Then, the feedstock liquid 42 was allowed to fall in drops from the nozzles 4 to a 28%-by-weight aqueous ammonia solution 10 stored in the aqueous ammonia solution reservoir 3, and uranyl nitrate in the drops was reacted with ammonia. ADU particles were produced by this reaction. The amount of the feedstock liquid 42 remaining in the feedstock liquid transferring passage 43 was about 750 mL.

Three days after the production of ADU particles as described above, a fresh feedstock liquid was prepared with the same method as in the previous production. The uranium content of the fresh feedstock liquid was 180 g/L, the temperature thereof was about 13° C., and the viscosity thereof was $55 \times 10^{-3}$ Pa·s (55 cP). On the other hand, the feedstock liquid 42 remaining in the feedstock liquid transferring passage 43 had a temperature of about 24° C. and a viscosity of $37 \times 10^{-3}$ Pa·s (37 cP).

Then, the remaining feedstock liquid collector 44 and the feedstock liquid remainder transferring passage 45 were attached to the apparatus for producing ADU particles 1. The fresh feedstock liquid was sent, as feedstock liquid 42, through the feedstock liquid transferring passage 43, and the feed feedstock liquid 42 remaining in the feedstock liquid transferring passage 43 from the previous production, as shown in FIG. 10, was pushed by the fresh feedstock liquid.

The pushed feedstock liquid remainder was transferred to the dripping nozzle device 2 with the nozzles 4, made to fall in drops 48 from the nozzles 4, and received by the remaining feedstock liquid collector 44. The feedstock liquid remainder received in the remaining feedstock liquid collector 44 was returned to the feedstock liquid reservoir 25 through the feedstock liquid remainder transferring passage 45 with the remaining feedstock liquid-returning pump 47. Then, the feedstock liquid remainder was mixed with the fresh feedstock liquid 42. The circulation of the feedstock liquid and the mixing were continued for 10 minutes while the feedstock liquid in the feedstock liquid reservoir 25 was being stirred thoroughly with a stirrer of the reservoir 25, which is not shown in the figures.

The remaining feedstock liquid collector 44 was removed from the paths along which the drops fell, and ADU particles were produced from the feedstock liquid 42 prepared by the mixing with the same method as in the first production. Deformations that might cause problems in later steps were not observed in the ADU particles produced in the aqueous ammonia solution 10.

The ADU particles thus produced were subjected to the aging treatment in which the ADU particles were heated so that uranyl nitrate even in the center of each particle was completely reacted with ammonia and the particle includes ammonium diuranate to the central part thereof. The aged ADU particles were washed with warm water, dried, and calcined in the atmosphere. These treatments turned the ADU particles into uranium trioxide particles. The uranium trioxide particles were further subjected to reduction and sintering, which produced uranium dioxide particles with a high density, the condition of which was like ceramics.

The uranium dioxide particles thus obtained were sifted with sieves and the particles with a particle size within a predetermined range were selected. Then, the selected particles were further selected with a selector of particles with good sphericity. A check of the yield revealed that 12 g of the produced was inferior.

Comparative Example 2

A uranyl nitrate solution was prepared by dissolving 5 kg of powdery $U_3O_8$ in 3.3 L of a 60%-by-weight nitric acid. To 7.5 L of the prepared uranyl nitrate solution were added an aqueous polyvinyl alcohol solution and tetrahydrofurfuryl alcohol as a thickening agent so that the amount of the former was 17% by volume and that of the latter 45% by volume based on the feedstock liquid prepared in this step. Thus, 24 L of the feedstock liquid was prepared. After 120 minutes from the preparation, the uranium content of this feedstock liquid was 180 g/L, the temperature thereof was 13° C., and the viscosity thereof was $55 \times 10^{-3}$ Pa·s (55 cP).

The feedstock liquid thus prepared was stored as feedstock liquid 42 in the feedstock liquid reservoir 25 of an apparatus for producing ADU particles that was same as the apparatus shown in FIG. 10 except that the apparatus of this comparative example was not provided with the device for recovering the feedstock liquid. The feedstock liquid 42 was sent to the dripping nozzle device 2 with nozzles 4 through the feedstock liquid transferring passage 43 with the feedstock liquid-sending pump 46. Then, the feedstock liquid 42 was allowed to fall in drops from the nozzles 4 to a 28%-by-weight aqueous ammonia solution 10 stored in the aqueous ammonia solution reservoir 3, and uranyl nitrate in the drops was reacted with ammonia. ADU particles were produced by this reaction. The amount of the feedstock liquid 42 remaining in the feedstock liquid transferring passage 43 was about 750 mL.

Three days after the production of ADU particles as described above, a fresh feedstock liquid was prepared with the same method as in the previous production. The uranium content of the fresh feedstock liquid was 180 g/L, the temperature thereof was about 13° C., and the viscosity thereof was $55 \times 10^{-3}$ Pa·s (55 cP). On the other hand, the feedstock liquid 42 remaining in the feedstock liquid transferring passage 43 had a temperature of about 22° C. and a viscosity of $39 \times 10^{-3}$ Pa·s (39 cP). With the feedstock liquid 42 remaining in the feedstock liquid transferring passage 43, ADU particles were produced in the same way as in the first production. In the initial stage of producing ADU particles by dripping the feedstock liquid 42 to the aqueous ammonia solution reservoir 3, deformations were observed in the ADU particles in the aqueous ammonia solution 10.

The ADU particles thus produced were aged, washed, dried, and calcined by the same methods as in Working Example 3, and uranium trioxide particles were obtained. The uranium trioxide particles were further subjected to reduction and sintering in the same way as in Working Example 3, which produced uranium dioxide particles with a high density, the appearance of which was like ceramics.

The uranium dioxide particles thus obtained were sifted with sieves and the particles with a particle size within a predetermined range were selected. Then, the selected particles were further selected with a selector of particles with good sphericity. A check of the yield revealed that 150 g of the produced was inferior. We assumed that the production of this relatively large amount of inferior particles was due to the deformed ADU particles.

Fifth Embodiment

The fifth embodiment is an example of the device for supplying a feedstock liquid, and also an example of the apparatus for producing ADU particles into which the device for supplying a feedstock liquid is incorporated. The device for supplying a feedstock liquid according to the present invention may be incorporated into other embodiments of the apparatus for producing ADU particles.

Figure 12:
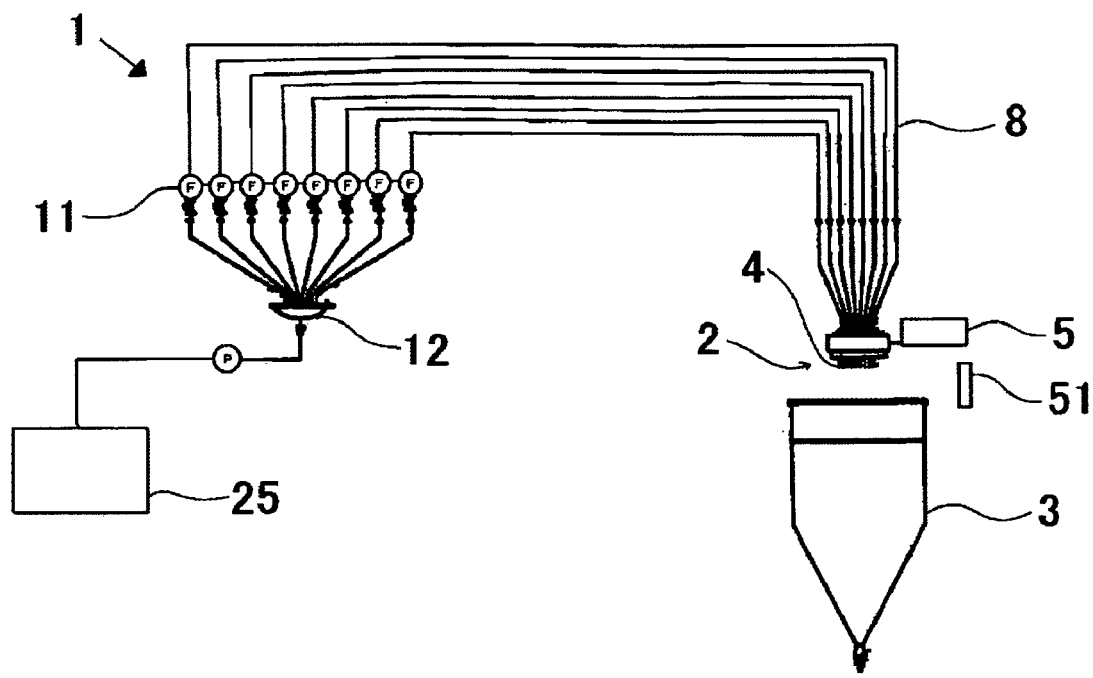
FIG. 12 is an illustration showing an example of the apparatus for producing ADU particles according to the present invention.

An example of the apparatus for producing ADU particles according to the present invention is shown in FIG. 12. The apparatus shown in FIG. 12 is merely an example of the present invention, and the apparatus for producing ADU particles according to the present invention is not limited to the example. As shown in FIG. 12, the apparatus for producing ADU particles 1 is provided with a dripping nozzle device 2 with nozzles 4, a vibrator 5, a strobe light irradiator 51, which is an example of the light irradiator, flow regulators 11, feedstock liquid supplying pipes 8, a separator 12, a pump P, a feedstock liquid reservoir 25, and an aqueous ammonia solution reservoir 3.

The dripping nozzle device 2 has nozzles 4 that are aligned with one end of each nozzle 4 facing down and the longitudinal axes of the nozzles being parallel with each other. The nozzles 4 have the same structure. When the nozzles 4 are tubular, they all have the openings of the same diameter and the same longitudinal length, and are made of the same material. In other words, the nozzles 4 are designed in such a manner that they have the same structural conditions for dripping the feedstock liquid.

The nozzles 4 are for dripping the feedstock liquid, which is sent through the feedstock liquid supplying pipes 8, to the aqueous ammonia solution stored in the aqueous ammonia solution reservoir 3. The nozzles are the same as those explained in relation to the other embodiments of the present invention.

The number of the nozzles is preferably from 2 to 32, particularly from 4 to 16.

As mentioned above, the nozzles 4 should be aligned. However, they may be so arranged that the projections of the respective ends of the nozzles 4, when the ends are projected on a plane, form a circle, an oval, or a square, according to circumstances.

The dripping nozzle device 2 is placed above the aqueous ammonia solution reservoir 3 so that the drops fall in the central part of the horizontal section of the reservoir 3. The other end of each nozzle 4 is connected to each of the feedstock liquid supplying pipes 8. The vibrator 5 is installed to the dripping nozzle device 2. Details, such as the structure, the functions, and the frequency, of the vibrator 5 are the same as those of the vibrator explained in the first embodiment. For the dripping nozzle device 2 may also be employed the suitable dripping nozzle devices explained in the other embodiments.

The strobe light irradiator 51 irradiates the drops falling from the nozzles 4 with a light that flashes on and off periodically.

An example of the strobe light irradiator 51 may be a strobe light discharge tube.

The strobe light irradiator 51 should be placed at a location where the irradiator 51 can irradiate the drops falling from the nozzles 4 with light.

For the flow regulators 11 may be employed a known flow regulator, as long as it is capable of adjusting the flow rate of the feedstock liquid to be supplied to the nozzles 4. The flow regulators 11 are placed in the respective feedstock liquid supplying pipes 8 in this example, though there is no limitation on the location where the flow regulators 11 are placed.

The flow rate that is regulated by the flow regulator 11 is decided appropriately depending on the intended particle size of each drop.

One end of each feedstock liquid supplying pipe 8, provided with a flow regulator 11, is connected with a nozzle 4, and the other end of the pipe 8 is connected to the feedstock liquid reservoir 25 through the separator 12 and the single pump P. Alternatively, each feedstock liquid supply pipe 8 may be connected to the feedstock liquid reservoir 25 through a pump with which the pipe 8 is provided, without the separator 12.

The feedstock liquid supplying pipe 8 should be a pipe that has chemical resistance and corrosion resistance, and also is flexible at a portion near the nozzle 4.

Materials for the feedstock liquid supplying pipe 8 include inorganic materials such as stainless steel, aluminum, and aluminum alloy, and high polymer materials such as polyethylene resin, polystyrene resin, polytetrafluoroethylene resin, natural rubber, and butyl rubber. These materials may be used singly or in combination.

The pump P is for supplying the feedstock liquid stored in the feedstock liquid reservoir 25 to the nozzles 4 through the flow regulators 11 and the feedstock liquid supplying pipes 8. Appropriately used for the pump P is a non-pulsation pump.

The feedstock liquid reservoir 25 is the same as those explained in the first to fourth embodiments.

With the apparatus for producing ADU particles 1 of this embodiment, ADU particles are produced in the following way.

A feedstock liquid, which has been adjusted to a predetermined composition, is supplied to and stored in the feedstock liquid reservoir 25.

With the pump P, the feedstock liquid is sent to the feedstock liquid supplying pipes 8 through the separator 12.

The feedstock liquid passes through the flow regulators 11 to the nozzles 4. Then, the feedstock liquid is dripped from the nozzles 4, to which vibrations are applied by the vibrator 5, to an aqueous ammonia solution stored in the aqueous ammonia solution reservoir 3.

The drops falling from the nozzles 4 are irradiated with a light flashing on and off periodically emitted from the strobe light irradiator 51 placed between the nozzles 4 and the aqueous ammonia solution reservoir 3.

Figure 13:
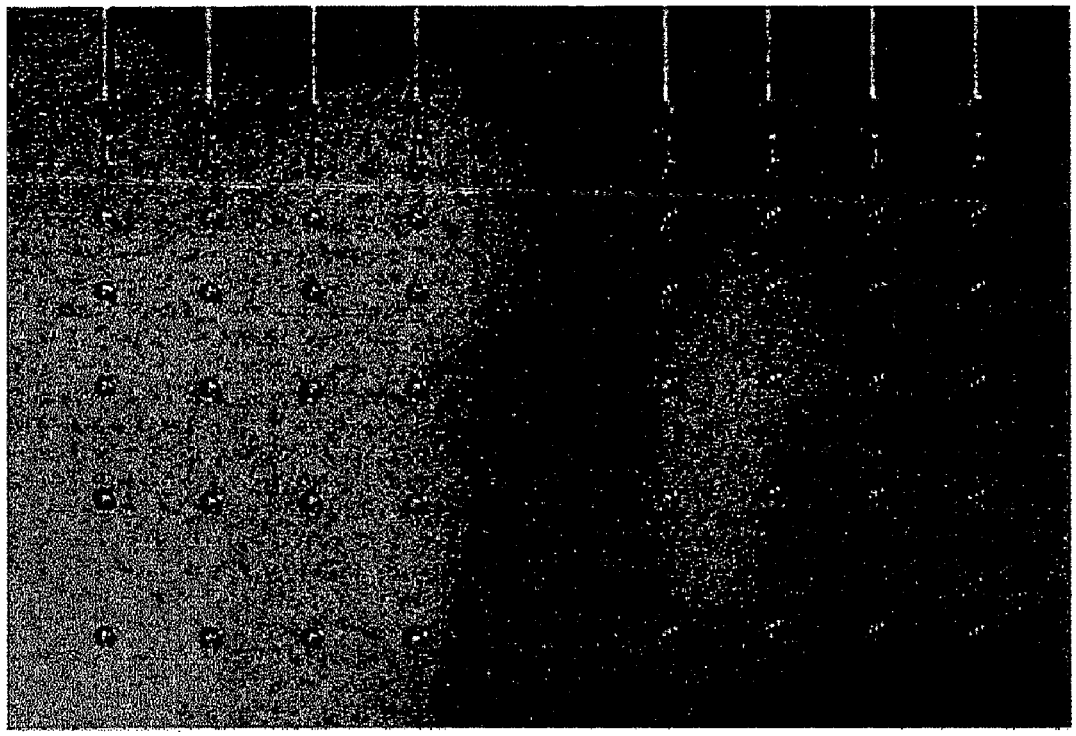
FIG. 13 shows a state where the drops dripped from the respective nozzles fall at the same rate and are at the same level at a given moment, by using the apparatus for producing ADU particles according to the present invention.

When falling drops are irradiated with a strobe light that flashes on and off at the same cycle as the frequency of the vibrations of the nozzles, the lines of the drops falling from the nozzles 4 are observed remaining stationary by the eye. As shown in FIG. 13, for example, the drops falling in lines from the ends of the nozzles 4 that are aligned with the axes thereof being parallel are observed being in a stationary state momentarily by the eye, by a flash of the strobe light.

If all the drops falling from the nozzles 4 have the same particle size and the same volume and the drops fall simultaneously from all the nozzles 4, the drops falling from all the nozzles are observed being aligned horizontally. On the other hand, if any one of the drops falling simultaneously from the nozzles is not observed being horizontally aligned with the others, the drop is considered to have a volume larger or smaller than the others.

On such occasions, the flow regulator 11 in the feedstock liquid supplying pipe 8 connected to the nozzle 4 from which the drop that is not observed being horizontally aligned with the others is operated and the flow rate of the feedstock liquid supplied to the nozzle 4 in question is finely adjusted. When the drops falling from the all the nozzles 4 are observed being horizontally aligned, the fine adjustment of the flow regulator is completed.

As explained, only the irradiation of the drops falling from the nozzles 4 with a strobe light enables the operator to judge whether or not the drops falling from all the nozzles 4 have the same volume, by observation with the eye, and to adjust the flow regulators easily so that the drops falling from all the nozzles 4 have the same volume.

The apparatus for producing ADU particles shown in FIG. 12 enables the user to make adjustments easily by the above-mentioned operation so that all the drops falling from the nozzles 4 have the same volume.

Because the drops all with the same volume fall in the aqueous ammonia solution stored in the aqueous ammonia solution reservoir, ADU particles with the same volume can be produced in this reservoir.

In the followings, an example of the device for supplying a feedstock liquid according to the present invention is described.

Figure 14:
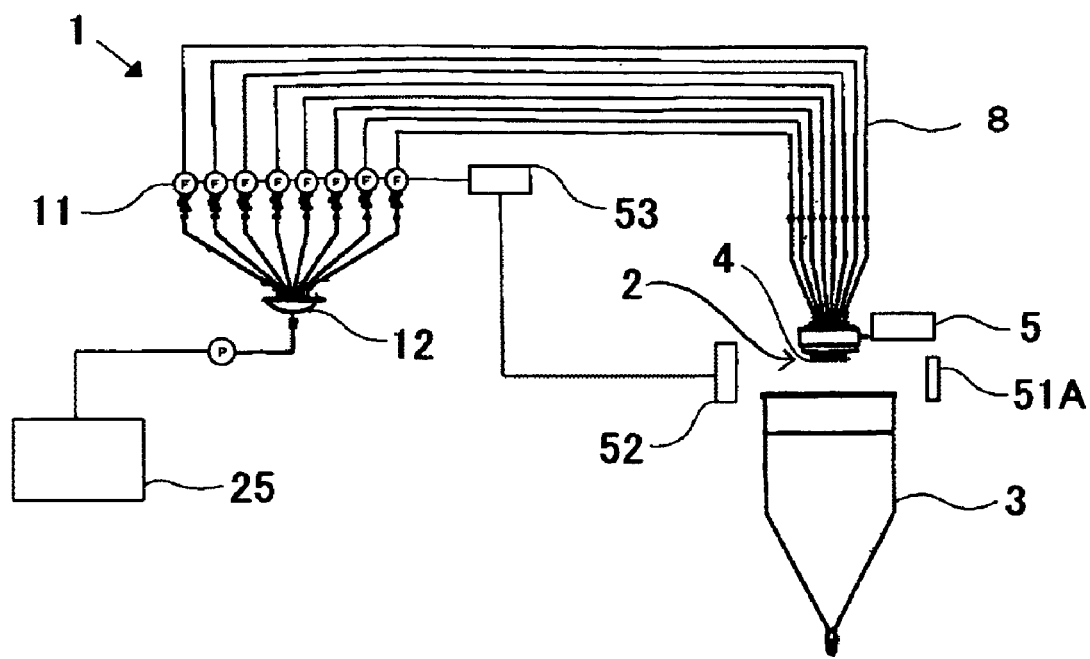
FIG. 14 is an illustration showing another example of the apparatus for producing ADU particles according to the present invention.

The apparatus for producing ADU particles shown in FIG. 14 is different from that shown in FIG. 12 in the following respect. The apparatus in FIG. 14 employs, in place of the strobe light irradiator 51, a continuum irradiator 51A that emits a continuum as light irradiator, photosensors such as photoelectric transducers 52 facing the continuum irradiator 51A with the falling lines of the drops from the nozzles 4 in between, and a controller 53 which measures the delay of a drop falling from a nozzle, if any, based on the light-detecting signals outputted by the photoelectric transducers 52 and sends a drive-controlling signal to the flow regulator 11 in the feedstock liquid supplying pipe 8 connected to the nozzle.

The number of the photoelectric transducers 52 equals the number of the nozzles 4. For example, when the device is equipped with eight nozzles 4, eight photoelectric transducers 52-1, 52-2, . . . 52-8 are employed.

For the photoelectric transducer may be used a known elements such as a CdS, a PbS, a PbSe infrared sensor, a phototransistor, a photodiode, an amorphous Se element, or an amorphous Si element.

Figure 15:
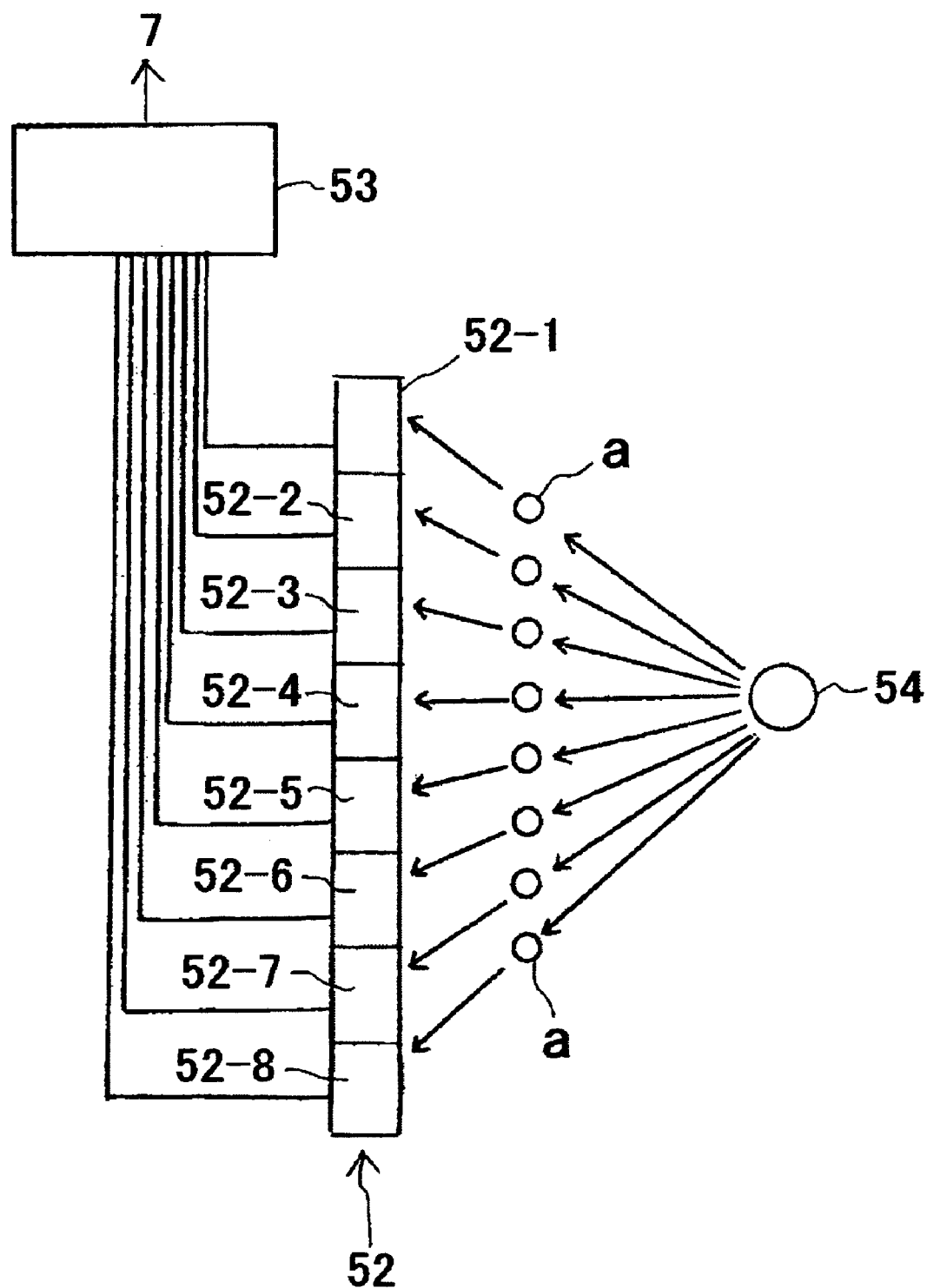
FIG. 15 is an illustration showing the light source, the photoelectric transducer, and the controlling unit of the apparatus shown in FIG. 14.

Each of the photoelectric transducers 52-1, . . . 52-8 is placed, for example as shown in FIG. 15, at a path of each drop a falling from the corresponding nozzle 4, facing the light source 54, which is the continuum irradiator 51A in this example, with the drops a falling from the nozzles 4 in the direction perpendicular to the sheet of the figure in between. When drops do not pass between the light source 54 and the photoelectric transducers 52-1, . . . 52-8, the photoelectric transducers output a constant detection signal A produced by photoelectric conversion. When drops pass between the light source 54 and the photoelectric transducers 52-1, . . . 52-8, the light, the intensity of which reduced by the absorption by the drops, reaches the photoelectric transducers 52-1, ... 52-8. Then, the light of reduced intensity is subjected to photoelectric conversion by the transducers, and the photoelectric transducers 52-1, ... 52-8 output a detection signal B, the level of which is less than that of the detection signal A. Thus, the detection signal B outputted by each of the photoelectric transducers 52-1, ... 52-8 means that a drop has passed between the light source 54 and the photoelectric transducer.

The detection signals outputted by the photoelectric transducers are sent to the controller 53. The controller 53 identifies the sender of each signal. For example, the detection signal outputted by the photoelectric transducer 52-1 is a continuous signal of a predetermined voltage when drops do not pass between the light source 54 and the transducer 52-1. Once a falling drop is located between the light source 54 and the transducer 52-1, the level of the detection signal outputted by the transducer 52-1 is lowered. The controller 53 converts the detection signal with the lowered level into a positive pulse as shown in FIG. 16(*a*).

When drops intermittently fall from the corresponding nozzle 4, the drops pass between the light source 54 and the photoelectric transducer 52-1 periodically. Therefore, the controller 53, into which the detection signals outputted by the transducer 52-1 are inputted, represents the continuous detection signals as pulse signals at regular intervals, as shown in FIG. 16(*a*). The controller 53 shows detection signals outputted by each of the photoelectric transducers 52-2, ... 52-8 as continual pulse signals, as well.

If the drops simultaneously falling from the respective nozzles 4 have the same volume, the drops pass between the light source 54 and the photoelectric transducers 52-1, ... 52-8 simultaneously. Therefore, in the controller 53, the pulse signals derived from the respective detection signals of the photoelectric transducers 52-1, ... 52-8 synchronize, as shown in FIG. 16(*a*).

Figure 16A:
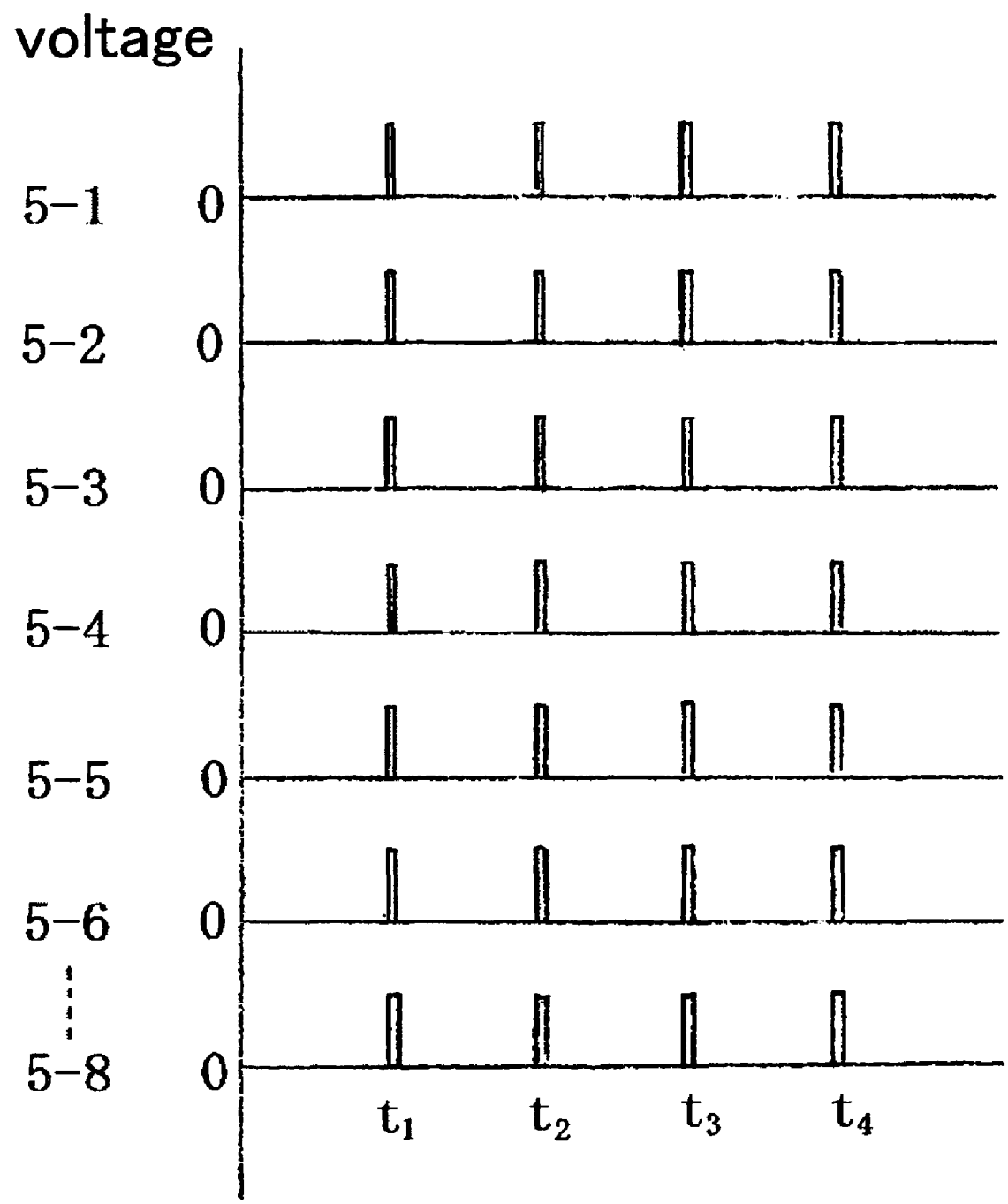
FIG. 16(a) is an illustration showing an array of pulse signals detected when the nozzles drip drops of the same volume and the dripping of one nozzle synchronizes with the drippings of the other nozzles, in the apparatus for producing ADU particles shown in FIG. 14.
Figure 16B:
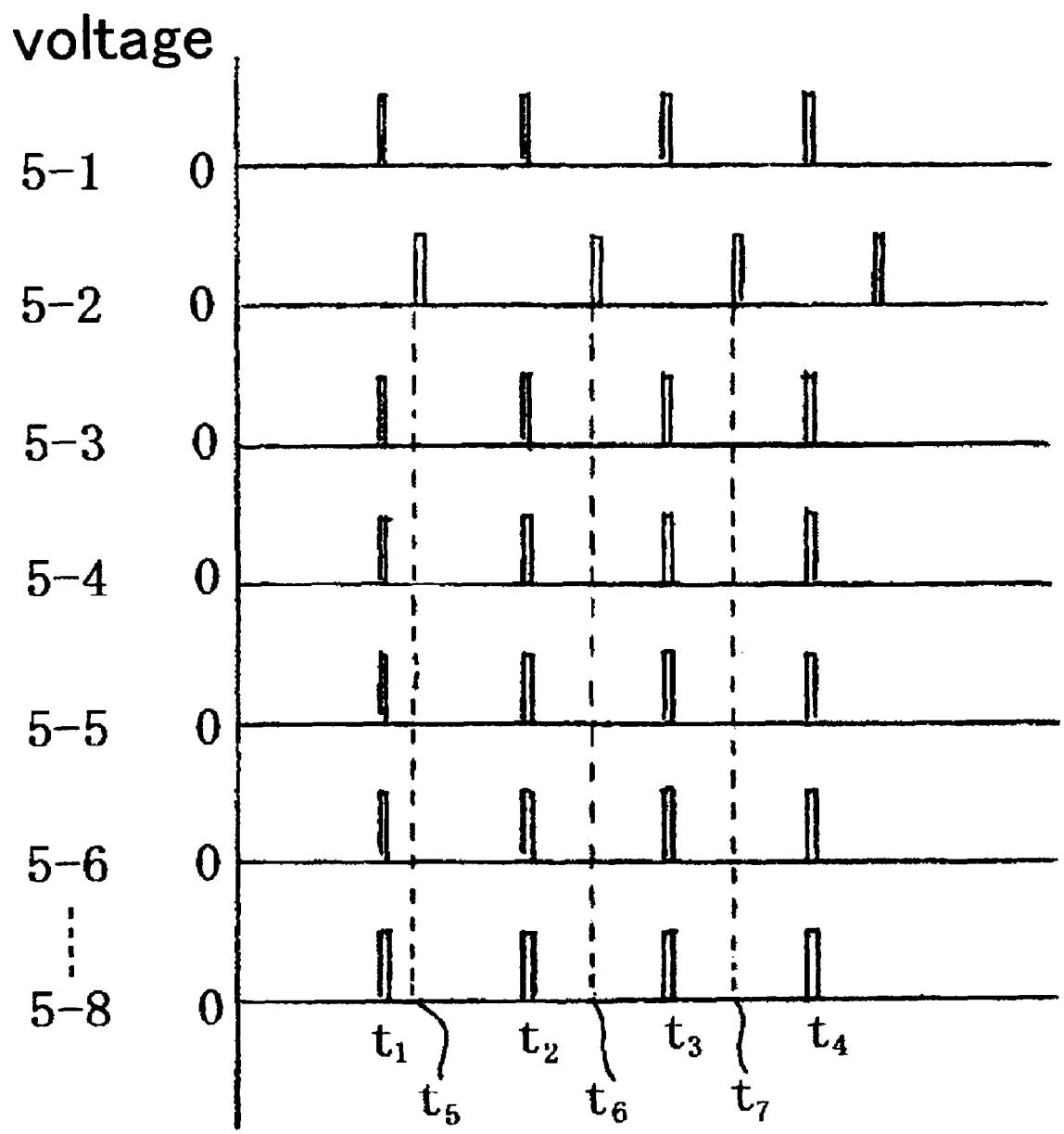
FIG. 16(b) is an illustration showing an array of pulse signals detected when the nozzles drip drops of different volumes and the drippings of the nozzles are not synchronized, in the apparatus of FIG. 14.

If the volume of the drops falling from one of the nozzles 4 is different from that of the drops falling from the other nozzles, the controller 53 produces pulse signals derived from the detection signals outputted by the photoelectric transducer 52-2 later than the pulse signals derived from the detection signals outputted by the other photoelectric transducers 52-1, 52-3, ... 52-8, as shown in FIG. 16(*b*).

When the controller 53 recognizes that the pulse signals associated with the photoelectric transducer 52-2 come later than those associated with the other photoelectric transducers 52-1, 52-3, ... 52-8 as shown in FIG. 16(*b*), it judges that the dripping of the nozzle 4, from which the drops that pass between the light source 54 and the photoelectric transducer 52-2 fall, is abnormal. Upon the detection of the abnormality, the controller 53 sends a drive-control signal to the corresponding flow regulator 11. Then the flow regulator 11, which has received the drive-controlling signal, adjusts the amount of the feedstock liquid to be supplied to the nozzle 4.

A method of controlling the flow regulator 11 is that the controller 53 continues outputting the drive-controlling signal to the flow regulator 11 until the pulse signals associated with the photoelectric transducer 52-2 become synchronized with those associated with the other photoelectric transducers 52-1, 52-3, ... 52-8. Another method includes the steps of storing in a memory in advance a calibration curve showing the relationship between the time lag between the occurrence of the pulse signal associated with the photoelectric transducer 52-2 and that of the pulse signals associated with the other photoelectric transducers, and the degree of controlling the corresponding flow regulator 11; finding the degree of controlling the flow regulator 11 on the calibration curve from the lime lag of the pulse signal associated with the photoelectric transducer 52-2; and sending the flow regulator 11 a predetermined corresponding control signal. Either method may be employed for this invention.

The apparatus for producing ADU particles equipped with the controller 53 is capable of automatically adjusting and controlling the volumes of the drops falling from several nozzles. Therefore the apparatus can produce ADU particles, the volumes of which have little dispersion.

We have explained so far the apparatus, which is an example of the apparatus for producing ADU particles according to the present invention, capable of making uniform the volumes of the drops that fall from several or many nozzles by manual or automatic control.

Sixth Embodiment

The sixth embodiment of the present invention is related to a device for solidifying the surfaces of drops, an example of the present invention, and the apparatus for producing ADU particles equipped with the device. The device for solidifying the surfaces of drops may be incorporated into various embodiments of the apparatus for producing ADU particles according to the present invention.

Figure 17:
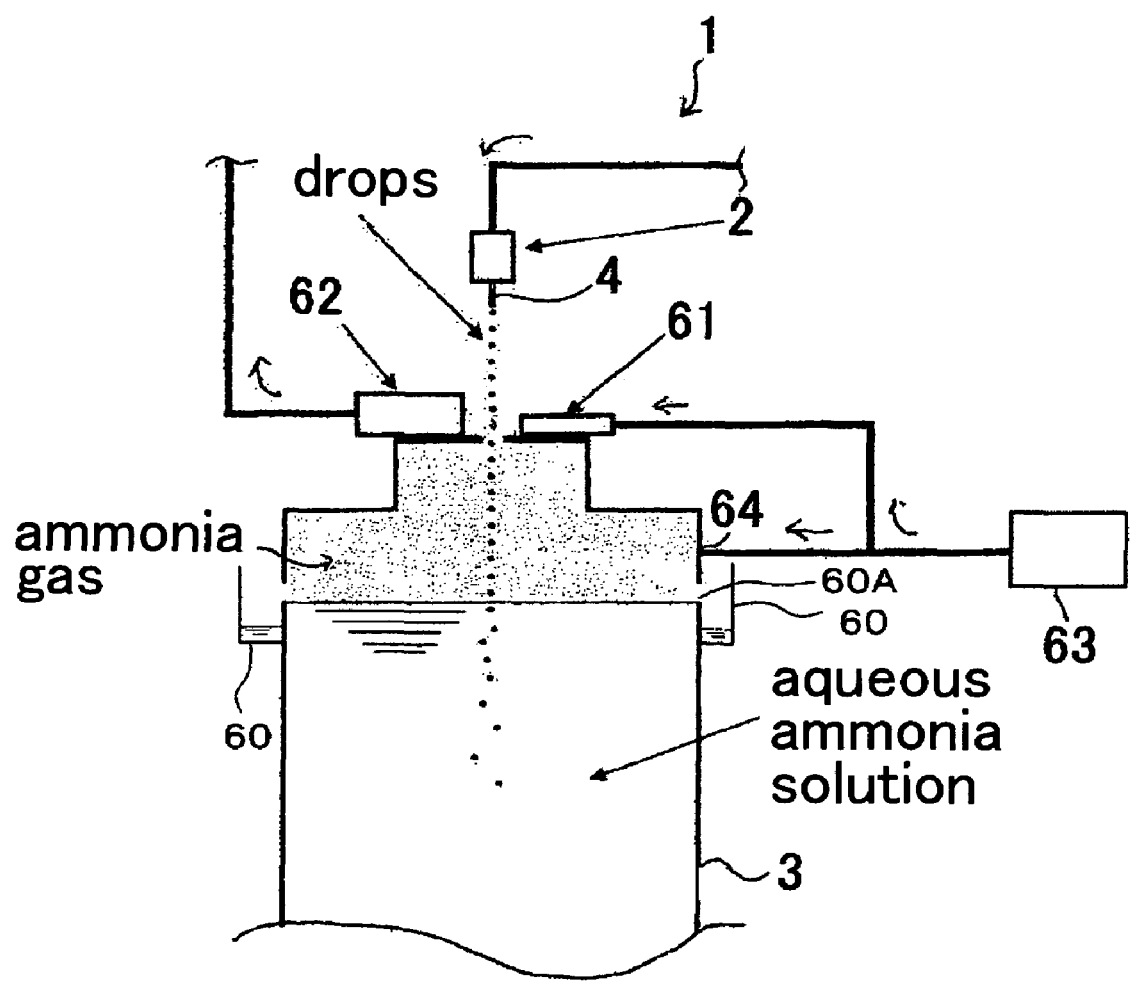
FIG. 17 is a schematic diagram showing an example of the apparatus for producing ADU particles according to the present invention.

As shown in FIG. 17, the apparatus for ADU particles of this embodiment has an aqueous ammonia solution reservoir 3, a dripping nozzle device 2 with nozzles placed above the aqueous ammonia solution reservoir 3, at least one ammonia gas sprayer 61 placed between the aqueous ammonia solution reservoir 3 and the dripping nozzle device 2, and at least one ammonia gas discharger 62.

As shown in FIG. 17, the aqueous ammonia solution reservoir 3 is a reaction vessel in which an aqueous ammonia solution is stored and ADU particles are produced by reacting uranyl nitrate included in drops falling from the nozzles 4 of the dripping nozzle device 2 with ammonia. The aqueous ammonia solution reservoir 3 is in the shape of a cylinder with the top end being opened and the bottom end being closed. The bottom of the aqueous ammonia solution reservoir 3 has an aperture for discharging the produced ADU particles, which may sometimes be called "the ADU particles" simply in this specification. The aperture is not shown in the figures associated with the sixth embodiment. As shown in FIG. 17, the aqueous ammonia solution reservoir 3 is provided with an aqueous ammonia solution discharger. The aqueous ammonia solution discharger is so designed that it is capable of keeping the level of the aqueous ammonia solution stored in the reservoir 3 constant so as to keep constant the distance between the surface of the aqueous ammonia solution and the bottom ends of the nozzles placed above the solution. In the sixth embodiment, the aqueous ammonia solution discharger has an overflow discharging hole 60A in the circumferential sidewall and an overflow receiver 60 for receiving the aqueous ammonia solution overflowing through the overflow discharging hole 60A. In this embodiment, the overflow receiver 60 is a tub surrounding the outside of the circumferential sidewall of the aqueous ammonia solution reservoir 3. The overflow receiver receives, through the overflow discharging hole 60A, the aqueous ammonia solution overflow caused by a rise of the level of the solution by the volume equal to the total of the volumes of the drops that have fallen in the aqueous ammonia solution reservoir 3, which ensures that the level of the aqueous ammonia solution in the reservoir 3 is kept constant. Because the level of the aqueous ammonia solution is kept constant even when a lot of drops fall in the solution, the distance between the lower ends of the nozzles and the surface of the solution remains constant. Then, all the drops falling from the nozzles pass through an atmosphere of ammonia gas formed by the ammonia gas sprayed by the ammonia gas sprayer 61 in the same way, the reaction between uranyl nitrate and ammonia takes place on the surfaces of all the drops uniformly, which results in the production of ammonium diuranate particles with good sphericity and of uniform quality.

The aqueous ammonia solution reservoir 3 also has, at the outside thereof, an ammonia gas supplier 63 for filling the reservoir 3 with ammonia gas. The ammonia gas (feeder) supplier 63 communicates with an ammonia gas-supplying inlet 64 that is arranged on the sidewall of the reservoir 3, and fills the space over the aqueous ammonia solution with the reservoir 3 with ammonia gas. The ammonia gas-supplying inlet 64 is located above the surface of the aqueous ammonia solution.

The dripping nozzle device 2 may be the same as the dripping nozzle devices explained in relation to the first to the fifth embodiments.

Figure 18:
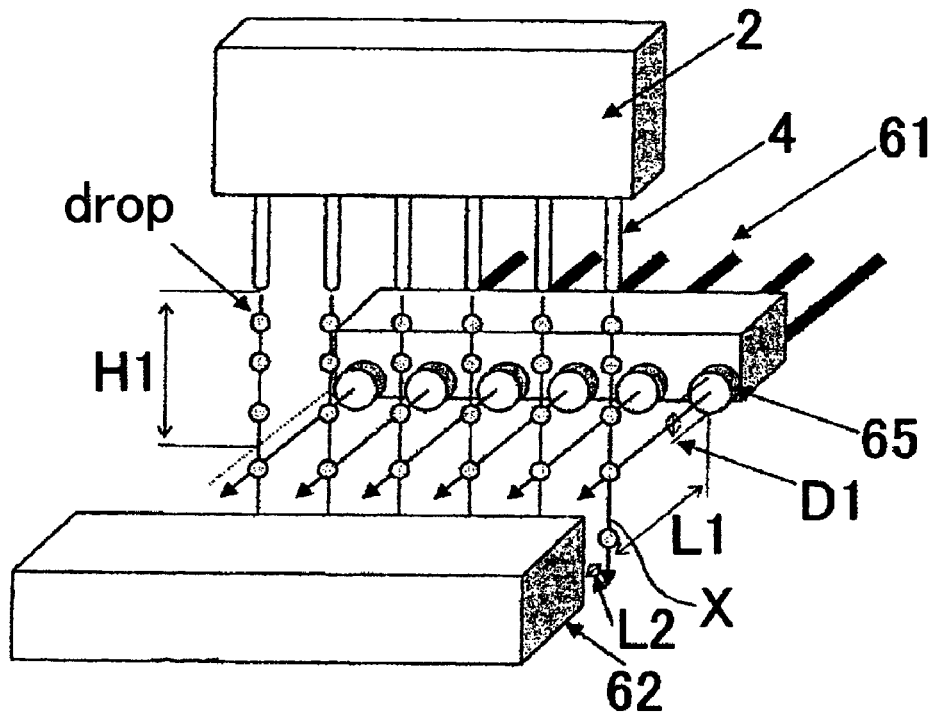
FIG. 18 is an enlarged perspective view showing the ammonia gas sprayer and the ammonia gas discharger.

The ammonia gas sprayer 61 is placed above the opening end of the aqueous ammonia solution reservoir 3 at a location where the sprayers do not block up the opening. The ammonia gas sprayer 61 is capable of spraying ammonia gas toward the paths X along which the drops from the nozzles 4 fall, details of which are illustrated in FIG. 18. The sprayer 61 has ammonia gas spraying nozzles 65, each of which is in the shape of a circle, and capable of spouting ammonia gas directed toward each falling path X. In other words, an ammonia gas-spraying nozzle 65 is arranged for each falling path X along which the drops fall from the corresponding one of the nozzles 4. The ammonia gas is fed to the ammonia gas sprayer 61 by the ammonia gas supplier 63.

Preferably, the path of the ammonia gas sprayed from each ammonia gas-spraying nozzle 65 is perpendicular to the corresponding falling path X. This arrangement enables the sprayer to uniformly spray the surface of each drop with ammonia gas.

In such an example as shown in FIG. 18, the inner diameter D1 of each of the ammonia gas-spraying nozzles 65 may be, for example, from 1 to 17 mm. When the inner diameter D1 is less than 1 mm, only part of the surface of a drop may be sprayed with ammonia gas. On the other hand, when the inner diameter D1 exceeds 17 mm, the drops adjacent to the target drop are simultaneously sprayed with ammonia gas, which may result in non-uniformity of ammonia sprayed onto the drops.

In such an application example as shown in FIG. 18, the distance H1 between the opening end of a nozzle 4 and the end of the corresponding ammonia gas-spraying nozzle 65 is, for example, from 10 to 40 mm. When the distance H1 is less than 10 mm, the time period for spraying one drop is too long, which means that the drop may be sprayed with an excess amount of ammonia gas. On the other hand, the distance H1 exceeds 40 mm, the time period for spraying one drop is too short, which means that the drop may be sprayed with an insufficient amount of ammonia gas.

Furthermore, in such a concrete example as shown in FIG. 18, the distance between a falling path X and the opening end of the corresponding ammonia gas-spraying nozzle 65 is, for example, from 3 to 15 mm. When the distance L1 is less than 3 mm, a drop may adhere to the nozzle 65. On the other hand, if the distance L1 exceeds 15 mm, the spouted ammonia gas may include an atmospheric air before reaching the drop, which makes the gas fail in keeping the concentration of ammonia gas in a level necessary to spray a drop with it effectively.

Figure 19:
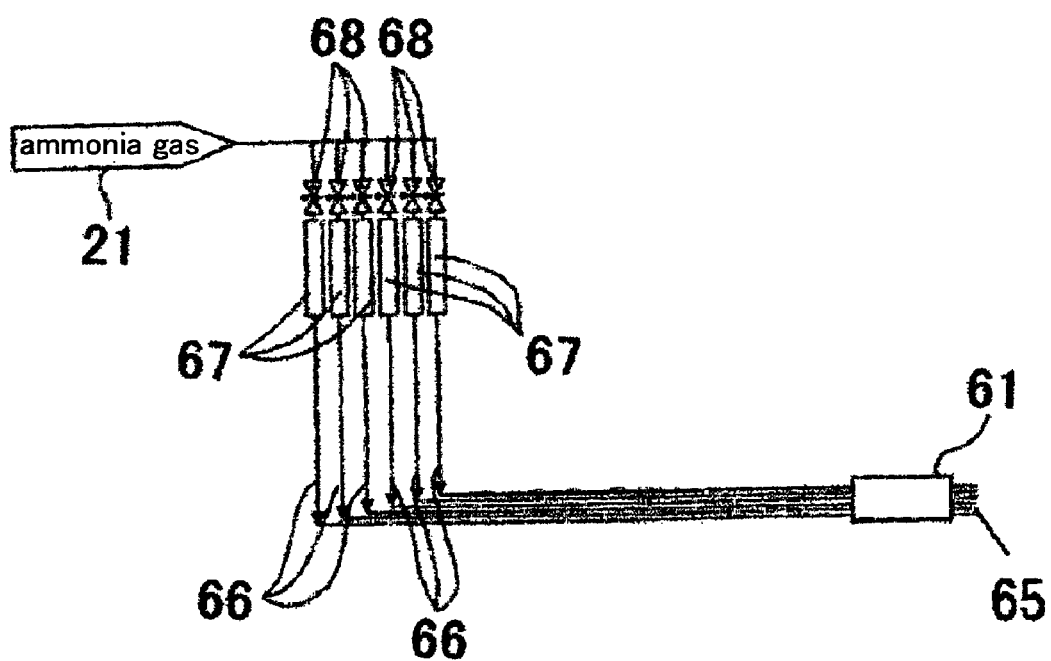
FIG. 19 is a schematic diagram showing an example of the ammonia gas sprayer.

Also, the ammonia gas sprayer 61 is capable of adjusting the flow rate of ammonia gas spouted from each nozzle. As illustrated in FIG. 19, an ammonia gas-feeding pipe 66 for feeding ammonia gas to each ammonia gas-spraying nozzle 65 (see FIG. 18) is provided with a flowmeter 67 and a valve 68. The operator can adjust the flow rate of ammonia gas spouted from each ammonia gas-spraying nozzle by operating the corresponding valve 68 with watching the associated flowmeter 67.

In the embodiment shown in FIG. 18, when the inner diameter D1, the distance H1, and the distance L1 are within the above-mentioned ranges respectively, the flow rate of the ammonia gas to be spouted from each ammonia gas-spraying nozzle 65 should be from 3 to 25 L/minute, measured with the flowmeter 67. If the flow rate of the ammonia gas to be spouted is less than 3 L/minute, there is a probability that drops poorly covered with a film including ammonium diuranate are made. On the other hand, if the flow rate is more than 25 L/minute, the stream of ammonia gas may interrupt the natural falling of drops and may also cause wave-like patterns on the surfaces of the drops.

The ammonia gas discharger 62 is so placed above the opening of the aqueous ammonia solution reservoir 3 that the discharger 62 does not block the opening. More in detail, as shown in FIG. 18, the ammonia gas discharger 62 is placed opposite the ammonia gas sprayer 61 with the falling path X in between, and the discharger 62 discharges the sprayed ammonia gas.

The distance L2 between the falling paths X and the end of the ammonia gas discharger 62 may be such a distance that the drops and the ammonia gas discharger 62 do not interfere with each other while the discharger 62 is able to discharge the ammonia gas spouted from the ammonia gas-spraying nozzles 65.

The ammonia gas discharger 62 in this arrangement is able to keep the streams of the ammonia gas spouted by the ammonia gas sprayer 61 from being stagnant and to form ammonia gas streams smoothly flowing from the ammonia gas sprayer 61 to the ammonia gas discharger 62.

The ammonia gas discharger 62 should be so designed as to be able to form smoothly flowing streams of ammonia gas without causing turbulence in the streams that cross the paths X of the falling drops. A preferable example of the ammonia gas discharger 62 has a gas-sucking member, such as a fan, in its inside, which fan is not shown in the figures. The ammonia gas discharger 62 with the gas-sucking member can prevent the ammonia gas spouted by the ammonia gas-spraying nozzles 65 from ascending to the dripping nozzles 4. Preventing the nozzles 4 from being plugged up makes smoother the production of ammonium diuranate particles.

In the embodiment shown in FIG. 18, the ammonia gas discharger 62 has one ammonia gas sucking opening, which is not shown in the figures, for each ammonia gas-spraying nozzle, with the ammonia gas sucking opening facing the corresponding ammonia gas-spraying nozzle 65.

The ammonia gas discharger 62 in this design is capable of forming streams of the ammonia gas spouted from the ammonia gas-spraying nozzles 65 with a good shape and without turbulence, between the ammonia gas-spraying nozzles 65 and the ammonia gas sucking openings facing the nozzles 65. When the drops fall through the ammonia gas streams flowing smoothly without turbulence, each ammonia gas stream flows in such a manner that it covers the entire drop with itself. Thus a uniform film including ammonium diuranate is formed on the surface of each drop.

How to use the apparatus for producing ADU particles as described above and the operation thereof are explained in the followings. Firstly, a predetermined amount of an aqueous ammonia solution in a predetermined concentration is stored in the aqueous ammonia solution reservoir 3. On the other hand, the ammonia gas supplier 63 is activated and the reservoir 3 is filled with ammonia gas.

Then, a feedstock liquid, which was prepared in advance, is allowed to flow through the dripping nozzle device 2, and the feedstock liquid is dripped from the nozzles 4. The drops from the nozzles fall along the respective falling paths X. At the same time, ammonia gas is sprayed toward each path X along which the drops from the corresponding nozzle 4 fall, from the associated ammonia gas-spraying nozzle 5 of the ammonia gas sprayer 61. The ammonia gas spouted from the ammonia gas-spraying nozzles 65 is sprayed over the drops uniformly, and gelation takes place and advances on the surface of each drop.

The ammonia gas discharger 62 discharges the spouted ammonia gas. This discharge enhances the directivity of the ammonia gas streams, and keeps the streams from interfering with each other. The discharge can also prevent the ammonia gas from ascending toward the dripping nozzles, which prevents, in turn, the nozzles from being plugged up because of the gelation in the nozzles.

The drops sprayed with the ammonia gas fall into the aqueous ammonia solution reservoir 3 from the opening thereof. The space over the aqueous ammonia solution in the reservoir 3 is filled with ammonia gas. Therefore when the drops pass through the atmosphere of ammonia gas within the reservoir 3, the drops absorb ammonia gas. This absorption further advances the gelation on the surfaces of the drops.

Thereafter the drops fall in the aqueous ammonia solution in the aqueous ammonia solution reservoir 3, and sink in the solution. During this sinking, the drops further absorb ammonia from the aqueous ammonia solution. The gelation not only takes place on the surface of each drop, but also progresses to the center thereof. Finally ADU particles are produced.

When a lot of drops sink in the aqueous ammonia solution, the level of the solution is raised by the volume equal to the total of the volumes of the drops. The raised volume of the solution overflows through the overflow discharging hole 60A, and the overflow receiver 60 receives the volume of the solution. The overflow receiver 60 is provided with a drain to carry the solution away, which is not shown in the figures.

After a predetermined period of time, the ADU particles that are produced in the progressed reaction and sink in the lower part of the aqueous ammonia solution reservoir 3 are taken out of the reservoir 3 through an aperture, which is not shown in the figures associated with this embodiment, formed in the reservoir 3.

The ADU particles taken out of the aqueous ammonia solution reservoir 3 are dried, calcined in predetermined conditions, reduced and sintered, and finally uranium dioxide particles are produced.

The embodiment as we have described so far bring the following technical advantages:

(1) Because the drops falling from the nozzles of the dripping nozzle device 2 are sprayed with ammonia gas that is spouted from the ammonia gas sprayer 61 toward each of the paths X along which the drops from the respective nozzles fall, which means that each drop is sprayed with ammonia gas uniformly, the produced ADU particles do not have wave-like patterns on the surface thereof, and the uniform gelation of the surface results in uranium dioxide particles with good sphericity.

(2) Because the ammonia gas discharger 62 discharges the spouted ammonia gas, the directivity of each stream of ammonia gas is enhanced. This enhancement results in a decrease in the interference of the ammonia gas streams with each other, which advances uniform gelation on the surfaces of the produced ADU particles, without wave-like patterns on the surfaces thereof. This also prevents the drops from serious deformation when they collide with the aqueous ammonia solution.

(3) The ammonia gas sprayer 61 makes it possible to adjust the flow rate of ammonia gas to be spouted from each ammonia gas-spraying nozzle. Even when the pressure loss of ammonia gas is different from nozzle to nozzle, the spouting conditions of ammonia gas can be made the same with all the nozzles.

Needless to say, the invention is not limited to this example only but changes and modifications within the scope of the invention are included in the present invention.

Figure 20:
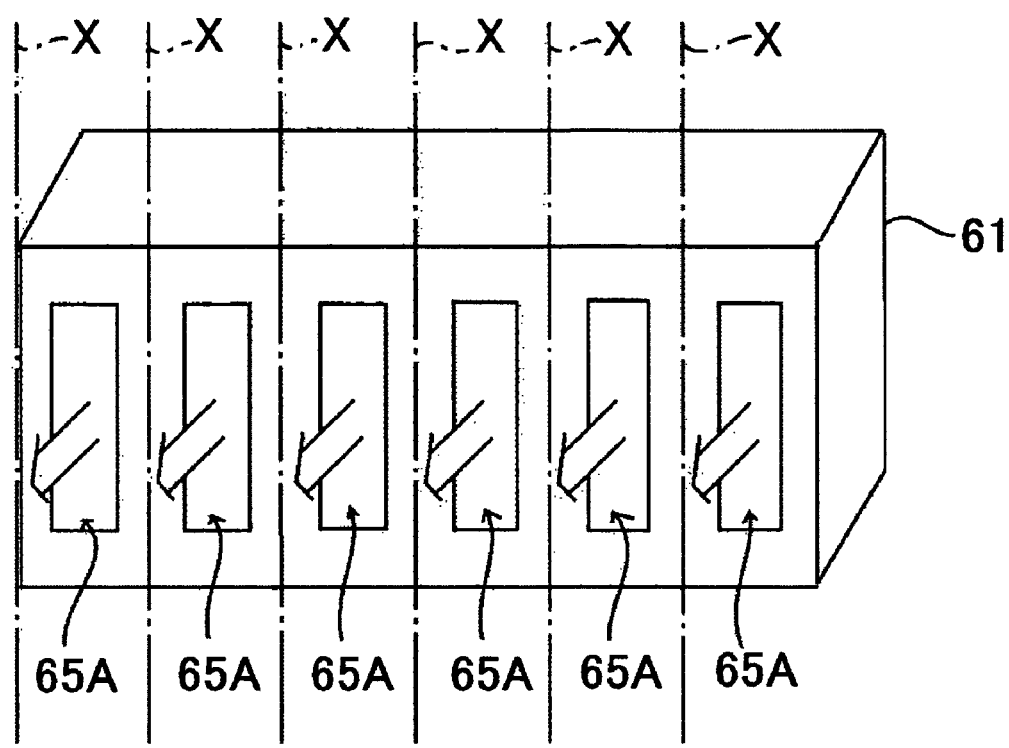
FIG. 20 is a schematic diagram showing a variation of the ammonia gas sprayer.

For example, the ammonia gas sprayer 61, which is provided with ammonia gas-spraying nozzles 65 in the shape of a circle in the described embodiment, may have ammonia gas-spraying nozzles 65 in the shape of a slit elongated in the direction of the drop-falling path X, as shown in FIG. 20.

The structures and shapes of the components may be so changed that the apparatus with the changed components can achieve the objectives of the present invention.

Seventh Embodiment

The seventh embodiment is related to the device for circulating an aqueous ammonia solution, an example of the present invention, and the apparatus for producing ADU particles into which the device is incorporated, again an example of the present invention. The device for circulating an aqueous ammonia solution may be incorporated into various embodiments of the apparatus for producing ADU particles according to the present invention.

Figure 21:
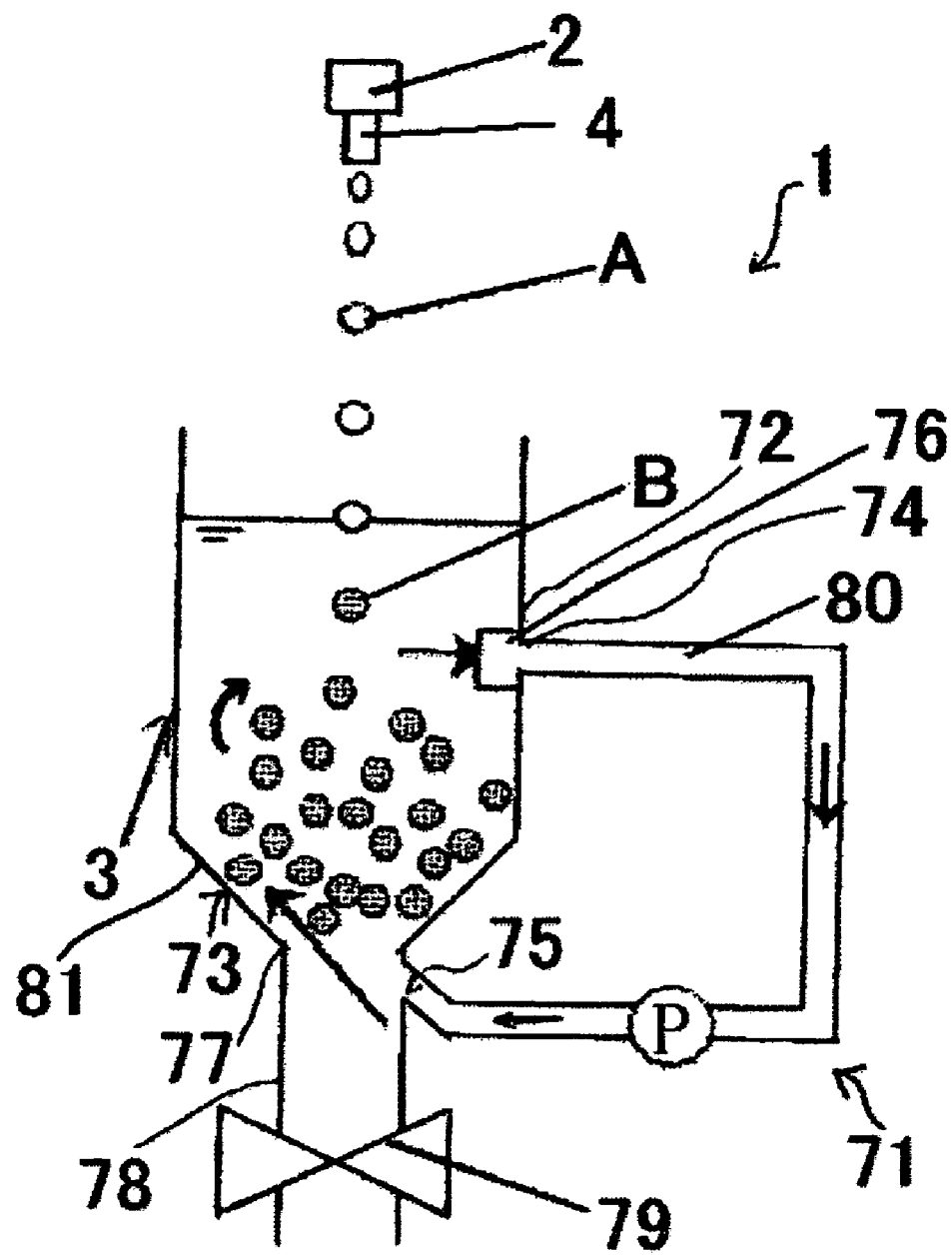
FIG. 21 is a schematic diagram showing an example of the apparatus for producing ADU particles according to the present invention.

As shown in FIG. 21, the apparatus for producing ADU particles 1, an embodiment of the present invention, has an aqueous ammonia solution reservoir 3, a dripping nozzle device 2, and the device for circulating an aqueous ammonia solution 71.

The aqueous ammonia solution reservoir 3 is a vessel in which an aqueous ammonia solution is stored and ADU particles are produced by reacting ammonia included in the aqueous ammonia solution and uranyl nitrate included in drops falling from the dripping nozzle device 2, which will be described hereinafter.

Materials for the aqueous ammonia solution reservoir 3 are the same as those explained in relation to the first embodiment.

There is no limitation on the shape of the aqueous ammonia solution reservoir 3, as long as an aqueous ammonia solution can be stored in it. However, it is preferable if, for example, the upper part of the reservoir 3 is in the shape of a cylinder and the lower part 73 thereof is in the shape of a funnel.

From the reservoir with this shape can be taken out the ADU particles without ADU particles remaining in the lower part 73, which makes maintenance of this apparatus easy.

In the sidewall 72 and the lower part 73 of the aqueous ammonia solution reservoir 3 are formed a side hole 74 and a bottom hole 75, respectively.

The side hole 74 is preferably covered with a member 76 for preventing solids from inflow that prevents solids, such as ADU particles, fragments and shreds thereof from flowing into a pipe 80 for circulating the aqueous ammonia solution. It is more preferable if the bottom hole 75 is covered with the same member 76 for preventing solids from inflow.

Anything that is capable of serving the purpose, of being used in an atmosphere of ammonia, and dose not cause a considerable pressure loss can be used as member 76 for preventing solids from inflow. Examples of the member 76 may be porous articles such as a ceramic filter, nets such as a metal mesh made of stainless steel, clumping such as glass wool, woven fabric, non-woven fabric, and knitted fabric.

The bottom 77 of aqueous ammonia solution reservoir 3 should also be provided with a collecting pipe 78 and an opening/closing device 79 capable of opening and closing the collecting pipe 78. The apparatus of this embodiment makes it possible to take ADU particles deposited in the bottom 77 of the aqueous ammonia solution reservoir 3 out to the outside of the reservoir 3, by the force of gravity, through the collecting pipe 78 and the opening/closing device 79, without using special equipment.

There is no limitation on the material for the collecting pipe 78, as long as it has corrosion resistance, especially alkali resistance, heat resistance and pressure resistance. Examples of the material may be glass, stainless steel, aluminum, aluminum alloy, magnesium, magnesium alloy, zirconium, and zirconium alloy.

The opening/closing device 79 may be any means as long as it is capable of opening and closing the collecting pipe 78. The device includes, for example, a globe valve and a butterfly valve.

The dripping nozzle device 2 has nozzles 4 that drip the feedstock liquid into the aqueous ammonia solution stored in the aqueous ammonia solution reservoir 3. The nozzles 4 may be, for example, the same as those explained in relation to the first embodiment.

The device 71 for circulating an aqueous ammonia solution is so designed that the aqueous ammonia solution is circulated by supplying the solution to the lower part 73 of the aqueous ammonia solution reservoir 3 and discharging the solution from the side hole 74, which enables ADU particles produced by the reaction between ammonia and uranyl nitrate included in the drops dripped into the aqueous ammonia solution reservoir 3 to move upward.

The device 71 for circulating an aqueous ammonia solution is preferably provided with an aqueous ammonia solution circulating path that is connected with the side hole 74 formed in the sidewall of the aqueous ammonia solution reservoir 3 and with the bottom hole 75 formed in the lower part thereof, such as an aqueous ammonia solution circulating pipe 80; and a pump P placed in the aqueous ammonia solution circulating pipe 80.

The part of the aqueous ammonia solution-circulating pipe 80, which part is directly connected with the bottom hole 75, should be inclined downward.

The apparatus of this embodiment makes the aqueous ammonia solution supplied from the bottom hole 5 flow upward, which pushes up the drops, which have fallen and been deposited around the lower part 73, from the bottom. The apparatus of this embodiment is capable of creating the flow that can move the drops upward.

The aqueous ammonia solution circulating pipe 80 should be so connected with the bottom hole 75 so that the axis of the inclined part, which inclined part is directly connected with the bottom hole 75, should be parallel with the inner face 81 of the lower funnel part 73, as shown in FIG. 21.

This arrangement makes the aqueous ammonia solution supplied from the bottom hole 5 flow upward, which pushes up the drops, which have fallen and been deposited around the lower part 73, from the bottom. The upward flow ascends along the inner face 81 of the lower part 73, and hits against the vertical wall of the reservoir 3, which makes a swirling current in the aqueous ammonia solution reservoir 3. The drops that have fallen in the reservoir 3 are carried on this current and stirred, which prevents the drops from being deposited on each other. Thus this arrangement can further prevent the drops from deformation.

The operation of the apparatus for producing ADU particles 1 as we have described so far in this embodiment are explained in the followings. Firstly, the pump P is activated, so that the aqueous ammonia solution is circulated from the side hole 74 through the pump P to the bottom hole 75.

Then, the dripping nozzle device 2 is allowed to drip the feedstock liquid as drops A in the aqueous ammonia solution reservoir 3. This operation allows uranyl nitrate in the drops to react with ammonia, and ADU particles are produced.

In the aqueous ammonia solution reservoir 3, the aqueous ammonia solution supplied from the bottom hole 75 flows upward, which pushes up the drops, which have fallen and been deposited around the lower part 73, from the bottom. The apparatus of this embodiment is capable of creating the flow that can move the drops upward.

The operation is carried out for a predetermined period of time. After the reaction between uranyl nitrate and ammonia is considered to be completed, the pump P is stopped, which stops the flow in the aqueous ammonia solution reservoir 3.

Then, the opening/closing device 79 is operated and the collecting pipe 78 is set to an opened state. The produced particles are taken out from the aqueous ammonia solution reservoir 3.

This embodiment brings the following technical advantages:

(1) The embodiment enables the drops that have fallen in the aqueous ammonia solution reservoir 3 to flow upward, which stirs the drops in the reservoir 3. The stirring prevents the drops from being deposited on each other, which, in turn, prevents the drops from deformation. Also, since the aqueous ammonia solution flows and the drops moves, the portion of the aqueous ammonia solution, the ammonia of which has reacted on the surface of a drop and has been consumed, is removed from around the surface of the drop. This process ensures that the surface of the drop contacts a fresh portion of the aqueous ammonia solution, which improves the efficiency of the reaction. Therefore, the embodiment makes it possible to produce ADU particles with high quality, free from deformation and deficiencies of the inside structures, at high efficiency.

Needless to say, the present invention is not limited to this embodiment. The apparatuses with such changes and modifications that are made so that the objectives of the present invention can be achieved are included in the present invention.

Figure 22:
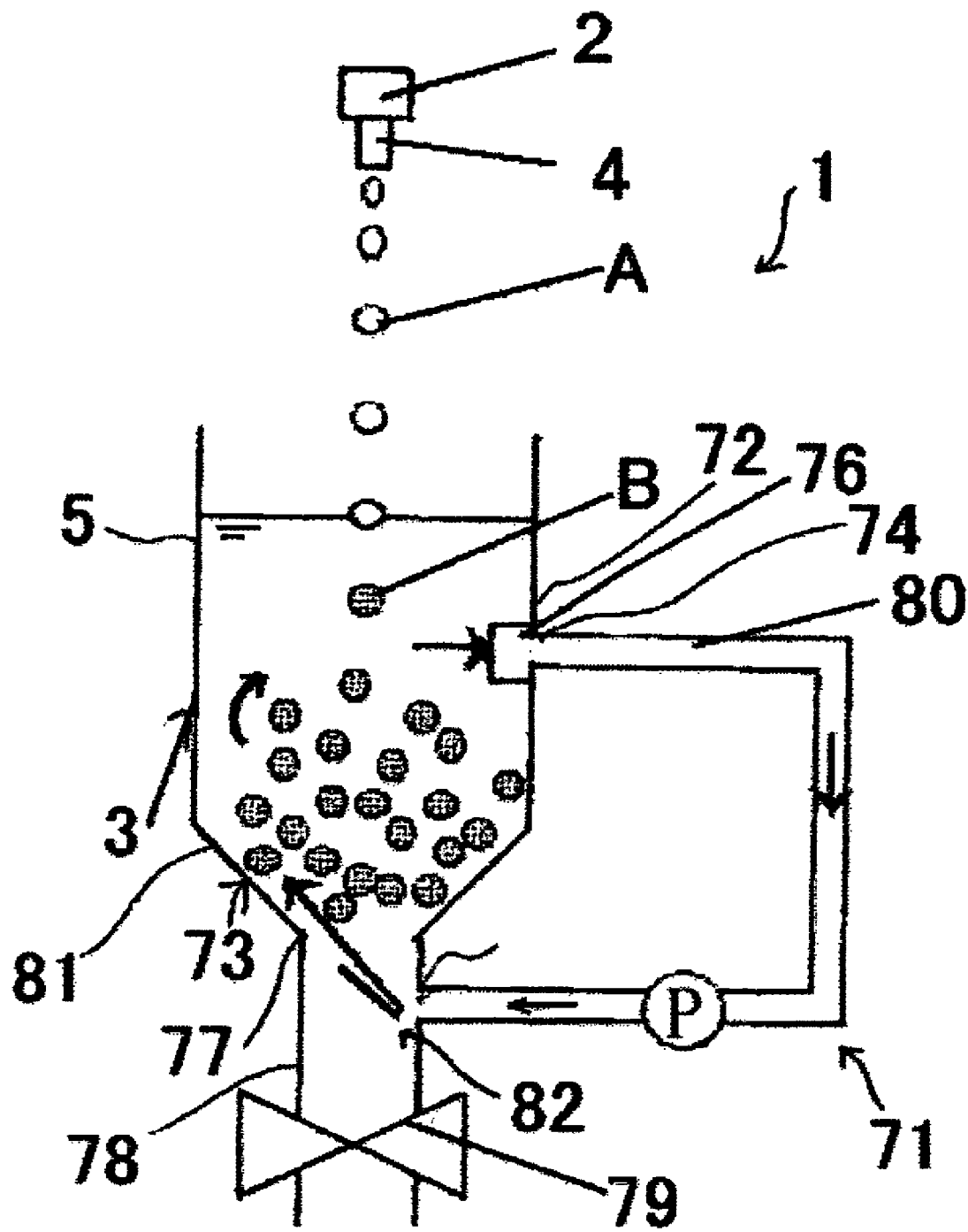
FIG. 22 is a schematic diagram showing a variation of the apparatus for producing ADU particles according to the present invention.

In this embodiment, the part of the aqueous ammonia solution-circulating pipe 80, which part is directly connected with the bottom hole 75, is inclined downward and an ascending current of the aqueous ammonia solution is formed. However, as shown in FIG. 22, an ascending current may be formed with a guide plate 82 that is placed in the vicinity the bottom hole 75. The guide plate 82 is inclined upward in relation to a virtual horizontal line. The guide plate 82 may be detachable so that it is used only when the aqueous ammonia solution is circulated, and removed after the operation.

In the above-mentioned embodiment the lower part 73 is in the shape of a funnel. However, the lower part 73 may also be cylindrical as well as the upper part.

Working Example 3

With the apparatus for producing ADU particles shown in FIG. 21, according to this embodiment, ADU particles were produced. The inner volume of the reservoir was 70 liters. The concentration of the aqueous ammonia solution was 25% by volume. Firstly, the pump P was activated, so that the aqueous ammonia solution was circulated from the side hole 74 through the pump P to the bottom hole 75.

Then, the dripping nozzle device 2 was allowed to drip the feedstock liquid as drops A in the aqueous ammonia solution reservoir 3. This operation allowed uranyl nitrate in the drops to react with ammonia, and uranium diuranate (ADU) was produced. The volume of the feedstock liquid dripped was about 10 liters.

In the aqueous ammonia solution reservoir 3, the aqueous ammonia solution supplied from the bottom hole 75 flowed upward, which pushed up the drops, which had fallen and been deposited around the lower part 73, from the bottom. The state where the drops flowed upward was created.

The operation was carried out for a predetermined period of time. After the reaction between uranyl nitrate and ammonia was done sufficiently, the pump P was stopped, which stopped the flow in the aqueous ammonia solution reservoir 3.

Then, the opening/closing device 79 was operated and the collecting pipe 78 was set to an opened state. The produced particles were taken out from the aqueous ammonia solution reservoir 3.

After the ADU particles were subjected to the ordinary treatments, the appearance and the section of the produced fuel kernels were observed. The observation did not find fuel kernels with deformation or pores inside them. This working example proved that ammonium diuranate (ADU) particles with high quality were effectively produced with the apparatus of this embodiment.

We claim:

1. A device for recovering a feedstock liquid, comprising a remaining feedstock liquid collector, placed between a dripping nozzle or dripping nozzles of a dripping nozzle device that comprises the dripping nozzle or dripping nozzles for dripping the feedstock liquid including uranyl nitrate to an aqueous ammonia solution, the dripping nozzle or dripping nozzles being placed above an aqueous ammonia solution reservoir so that an opening or openings of the dripping nozzle or dripping nozzles are directed downward and face the aqueous ammonia solution, wherein the feedstock liquid is transferred from a feedstock liquid reservoir having a temperature-controlling function through a feedstock liquid transferring passage to the dripping nozzle or nozzles and the aqueous ammonia solution reservoir in which an aqueous ammonia solution is stored, said remaining feedstock liquid collector for receiving a remainder of the feedstock liquid remaining in the feedstock liquid transferring passage when the dripping of the feedstock liquid from the dripping nozzle or nozzles to the aqueous ammonia solution is stopped; and a feedstock liquid remainder transferring passage for transferring the remainder to the feedstock liquid reservoir.

2. The device for recovering a feedstock liquid according to claim 1, wherein the dripping nozzle device comprises nozzles, and the device further comprising a single vibrator for vibrating the nozzles simultaneously.

3. The device for recovering a feedstock liquid according to claim 1, wherein the feedstock liquid transferring passage comprises a feedstock liquid supplier for supplying the feedstock liquid to the nozzles substantially at a constant flow rate and without pulsation.

4. A device for supplying a feedstock liquid comprising a strobe light irradiator for emitting a light that flashes on and off periodically for irradiating with the strobe light irradiator drops of a feedstock liquid that include uranyl nitrate, the drops being dripped from a dripping nozzle device, wherein the dripping nozzle device comprises dripping nozzles and the drops are dripped from each of the dripping nozzles; and flow regulators, each of said flow regulators controls an amount of the feedstock liquid to be supplied to each dripping nozzle from a feedstock liquid reservoir in which the feedstock liquid is stored, depending on conditions of the falling of the drops irradiated with the strobe light.

5. The device for supplying a feedstock liquid according to claim 4, the dripping nozzle device further comprising a single vibrator for vibrating the nozzles simultaneously.

6. The device for supplying a feedstock liquid according to claim 4, the dripping nozzle device further comprising a feedstock liquid supplier for supplying the feedstock liquid to the nozzles substantially at a constant flow rate and without pulsation.

7. The device for supplying a feedstock liquid according to claim 4, wherein the nozzles are aligned with the axes thereof being parallel and with the ends thereof being in lines, wherein the flow regulators, each of which is controlled so that the drops are observed being aligned horizontally when the drops fall simultaneously from all the nozzles.

8. A device for supplying a feedstock liquid comprising a continuum irradiator for irradiating with continuum light drops of a feedstock liquid that include uranyl nitrate, the drops being dripped from a dripping nozzle device, wherein the dripping nozzle device comprises dripping nozzles and the drops are dripped from each of the dripping nozzles; flow regulators, each of said flow regulators controls an amount of the feedstock liquid to be supplied to each dripping nozzle from a feedstock liquid reservoir in which the feedstock liquid is stored, depending on conditions of the falling of the drops irradiated with the continuum light irradiator; photosensors for sensing the light emitted by the continuum light irradiator; and a controller for controlling the flow regulators upon an input of a sensing signal outputted by the photosensors so that the nozzles drip at the same dripping rate, the drops dripped from each nozzle have the same volume, and a drop dripped from one of the nozzles has the same volume as a drop dripped from any other one of the nozzles.

9. The device for supplying a feedstock liquid according to claim 8, the dripping nozzle device further comprising a single vibrator for vibrating the nozzles simultaneously.

10. The device for supplying a feedstock liquid according to claim 8, the dripping nozzle device further comprising a feedstock liquid supplier for supplying the feedstock liquid to the nozzles substantially at a constant flow rate and with pulsation.

11. The device for supplying a feedstock liquid according to claim 8, wherein the controller converts the detection signals outputted by photosensors into positive pulse signals, and sends a drive-control signal to the corresponding flow regulator, when the pulse signals derived from the respective detection signals do not synchronize.

12. A device for solidifying the surfaces of drops, comprising an ammonia gas sprayer with ammonia gas-spraying nozzles, each spraying ammonia gas to each of paths along which drops of the feedstock liquid that include uranyl nitrate fall to an aqueous ammonia solution stored in an aqueous ammonia solution reservoir, the drops being dripped from a dripping nozzle device wherein the dripping nozzle device comprises nozzles and the drops are dripped from the nozzles, wherein the aqueous ammonia solution reservoir comprises an aqueous ammonia solution discharger for discharging the aqueous ammonia solution stored therein to keep constant the distance between the ends of the dripping nozzles and the surface of the aqueous ammonia solution, wherein the aqueous ammonia solution discharger has an overflow discharging hole in a circumferential sidewall of the aqueous ammonia reservoir and an overflow receiver for receiving the aqueous ammonia solution overflowing through the overflow discharging hole.

13. The device for solidifying the surfaces of drops according to claim 12, wherein the flow rates of the ammonia gas sprayed from the respective ammonia gas-spraying nozzles are adjustable.

14. A device for solidifying the surfaces of drops according to claim 12, wherein the distance between the ends of the dripping nozzles and the ends of the ammonia gas spraying nozzles is from 10 mm to 40 mm, the shortest distance between the paths along which the drops dripped from the ends of the dripping nozzles fall and the ends of the ammonia gas spraying nozzles is from 3 mm to 15 mm, and the flow rate of the ammonia gas sprayed from the ammonia gas spraying nozzles is from 3 L/min to 25 L/min.

15. The device for solidifying the surfaces of drops according to claim 12, the dripping nozzle device further comprising a single vibrator for vibrating the nozzles simultaneously.

16. The device for solidifying the surfaces of drops according to claim 15, the dripping nozzle device further comprising a feedstock liquid container capable of containing a predetermined volume of the feedstock liquid supplied from a feedstock liquid reservoir in which the feedstock liquid is stored, the container having an inner volume larger than the inner volume of each of the dripping nozzles, wherein the container supplies the contained feedstock liquid to all the dripping nozzles by the force of gravity.

17. The device for solidifying the surfaces of drops according to claim 16, wherein the feedstock liquid container has a horizontal section, the area of which is larger than the area of the horizontal section of each of the dripping nozzles.

18. The device for solidifying the surfaces of drops according to claim 16, wherein the feedstock liquid container is directly connected to all the dripping nozzles.

19. The device for solidifying the surfaces of drops according to claim 16, wherein the respective ends of all the dripping nozzles are provided with an edge thinned in the direction of the falling of the drops.

20. The device for solidifying the surfaces of drops according to claim 12, the dripping nozzle device further comprising a flow regulator capable of controlling a dripping rate of the feedstock liquid and a volume of each of the drops for each nozzle, wherein the flow regulator has a flow regulator valve and a flowmeter.

21. The device for solidifying the surfaces of drops according to claim 12, wherein the ammonia gas sprayer is placed above the opening end of the aqueous ammonia solution reservoir at a location where the sprayers do not block the opening end so that the path of the ammonia gas sprayed from each ammonia gas-spraying nozzle is perpendicular to the corresponding falling path of drops of the feedstock liquid dripped from the nozzles.

22. The device for solidifying the surfaces of drops according to claim 21, further comprising an ammonia gas discharger being placed opposite the ammonia gas sprayer with the falling path in between, wherein the discharger discharges the sprayed ammonia gas.

23. The device for solidifying the surfaces of drops according to claim 21, the aqueous ammonia solution reservoir further comprising an ammonia gas-supplying inlet for filling the reservoir with ammonia gas at a location above the surface of the aqueous ammonia solution on the sidewall of the aqueous ammonia solution reservoir.

24. An apparatus for producing ammonium diuranate particles, which comprises:
   (1) a dripping nozzle device, comprising dripping nozzles for allowing a feedstock liquid that includes uranyl nitrate to fall in drops to an aqueous ammonium solution stored in an aqueous ammonia solution reservoir, wherein the dripping nozzle device is placed above an aqueous ammonia solution reservoir so that openings of the dripping nozzle device are directed downward and face the aqueous ammonia solution;
   (2) a device for recovering the feedstock liquid, comprising:
      (2-1) a remaining feedstock liquid collector, placed between the dripping nozzles and the aqueous ammonia solution reservoir wherein the feedstock liquid is transferred from a feedstock liquid reservoir having a temperature-controlling function through a feedstock liquid transferring passage to the dripping nozzles, said remaining feedstock liquid collector for receiving a remainder of the feedstock liquid remaining in the feedstock liquid transferring passage when the dripping of the feedstock liquid from the dripping nozzles to the aqueous ammonia solution is stopped; and
      (2-2) a feedstock liquid remainder transferring passage for transferring the remainder to the feedstock liquid reservoir;
   (3) a device for supplying the feedstock liquid comprising a light irradiator for irradiating the drops with light, and flow regulators, each of which controls an amount of the feedstock liquid to be supplied to each dripping nozzle from the feedstock liquid reservoir, depending on conditions of the falling of the drops irradiated with the light;
   (4) a device for solidifying the surfaces of the drops, comprising an ammonia gas sprayer with ammonia gas-spraying nozzles, each spraying ammonia gas to each of paths along which the drops fall to the aqueous ammonia solution, wherein the distance between the ends of the dripping nozzles and the ends of the ammonia gas spraying nozzles is from 10 mm to 40 mm, the shortest distance between the paths and the ends of the ammonia gas spraying nozzles is from 3 mm to 15 mm, and the flow rate of the ammonia gas sprayed from the ammonia gas spraying nozzles is from 3 L/min to 25 L/min; and
   (5) a device for circulating the aqueous ammonia solution, comprising an aqueous ammonia solution circulating path through which the aqueous ammonia solution is circulated and returned to the aqueous ammonia solution reservoir, from a lower part of the reservoir, whereby ammonium diuranate particles produced by a reaction between uranyl nitrate and ammonia flow upward in the aqueous ammonia solution.

25. The apparatus for producing ammonium diuranate particles according to claim 24, wherein the device for circulating the aqueous ammonia solution comprises a pipe for circulating the aqueous ammonia solution connected to a side hole formed in a sidewall of the aqueous ammonia solution reservoir and a bottom hole formed in the lower part thereof; and a pump placed in the pipe for circulating the aqueous ammonia solution.

26. The apparatus for producing ammonium diuranate particles according to claim 25, wherein the side hole is covered with a member for preventing solids in the aqueous ammonia solution reservoir from flowing into the pipe for circulating the aqueous ammonia solution.

27. The apparatus for producing ammonium diuranate particles according to claim 24, wherein the aqueous ammonia solution reservoir has a bottom provided with a collecting pipe and an opening/closing device capable of opening and closing the collecting pipe.

\* \* \* \* \*